US 9,116,870 B2

(12) United States Patent
Matsuyama

(10) Patent No.: US 9,116,870 B2
(45) Date of Patent: *Aug. 25, 2015

(54) PROCESS AND METHOD FOR SAVING DESIGNATED REGISTERS IN INTERRUPT PROCESSING BASED ON AN INTERRUPT FACTOR

(71) Applicant: Renesas Electronics Corporation, Kawasaki-shi, Kanagawa (JP)

(72) Inventor: Hideki Matsuyama, Kawasaki (JP)

(73) Assignee: Renesas Electronics Corporation, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/584,778

(22) Filed: Dec. 29, 2014

(65) Prior Publication Data

US 2015/0113248 A1    Apr. 23, 2015

Related U.S. Application Data

(63) Continuation of application No. 13/084,946, filed on Apr. 12, 2011, now Pat. No. 8,959,317.

(30) Foreign Application Priority Data

Apr. 12, 2010   (JP) .................. 2010-091688

(51) Int. Cl.
G06F 9/48       (2006.01)
G06F 13/24      (2006.01)
(Continued)

(52) U.S. Cl.
CPC .............. G06F 13/24 (2013.01); G06F 9/3004 (2013.01); G06F 9/30043 (2013.01);
(Continued)

(58) Field of Classification Search
CPC ........... G06F 9/461; G06F 9/48; G06F 9/462; G06F 13/24; G06F 9/3004; G06F 9/30043; G06F 9/327; G06F 9/3802
See application file for complete search history.

(56) References Cited

U.S. PATENT DOCUMENTS 3,440,619 A   4/1969  Lehman et al.
4,020,471 A   4/1977  Woods et al.
(Continued)

FOREIGN PATENT DOCUMENTS

JP   H05-006281 A    1/1993
JP   9-134292 A      5/1997
JP   2005-275703 A   10/2005

OTHER PUBLICATIONS

Notification of Reason for Refusal dated Dec. 19, 2013 issued by the Japanese Patent Office in counterpart Japanese Patent Application No. 2010-091688.

(Continued)

Primary Examiner — Boris Gorney
Assistant Examiner — Jyoti Mehta
(74) Attorney, Agent, or Firm — Sughrue Mion, PLLC

(57) ABSTRACT

A microcomputer includes: a plurality of register lists having a plurality of register patterns, respectively, wherein each of plurality of register patterns designates registers, data of which are to be saved in a data memory; an instruction fetch control circuit configured to fetch instruction code from an instruction memory in response to an interrupt request issued based on occurrence of an interrupt factor; and a register data saving control circuit configured to acquire one register pattern from one of the plurality of register lists in response to the interrupt request, and issue a microinstruction based on the acquired register pattern in response to the interrupt request. An instruction executing section is configured to execute the microinstruction prior to the fetched instruction code, to save the data of registers designated based on the acquired register pattern in the data memory.

5 Claims, 27 Drawing Sheets

(51) Int. Cl.
*G06F 9/46* (2006.01)
*G06F 9/30* (2006.01)
*G06F 9/32* (2006.01)
*G06F 9/38* (2006.01)

(52) U.S. Cl.
CPC ............ *G06F 9/327* (2013.01); *G06F 9/3802* (2013.01); *G06F 9/461* (2013.01); *G06F 9/462* (2013.01); *G06F 9/48* (2013.01)

(56) References Cited

U.S. PATENT DOCUMENTS

| | | |
|---|---|---|
| 5,280,593 A | 1/1994 | Bullions et al. |
| 5,481,685 A | 1/1996 | Nguyen et al. |
| 5,682,531 A | 10/1997 | Nakamura |
| 6,298,370 B1 | 10/2001 | Tang et al. |
| 2005/0216708 A1 | 9/2005 | Katayama |

OTHER PUBLICATIONS

Chinese Office Action issued May 29, 2014 in corresponding Chinese Patent Application No. 201110094387.8.

McAuley et al., Fast Routing Table Lookup Using CAMs, Mar. 1993, INFOCOM '93, IEEE, 1-10.

Execution Unit, Oct. 30, 2005, Wikipedia, 1 page.

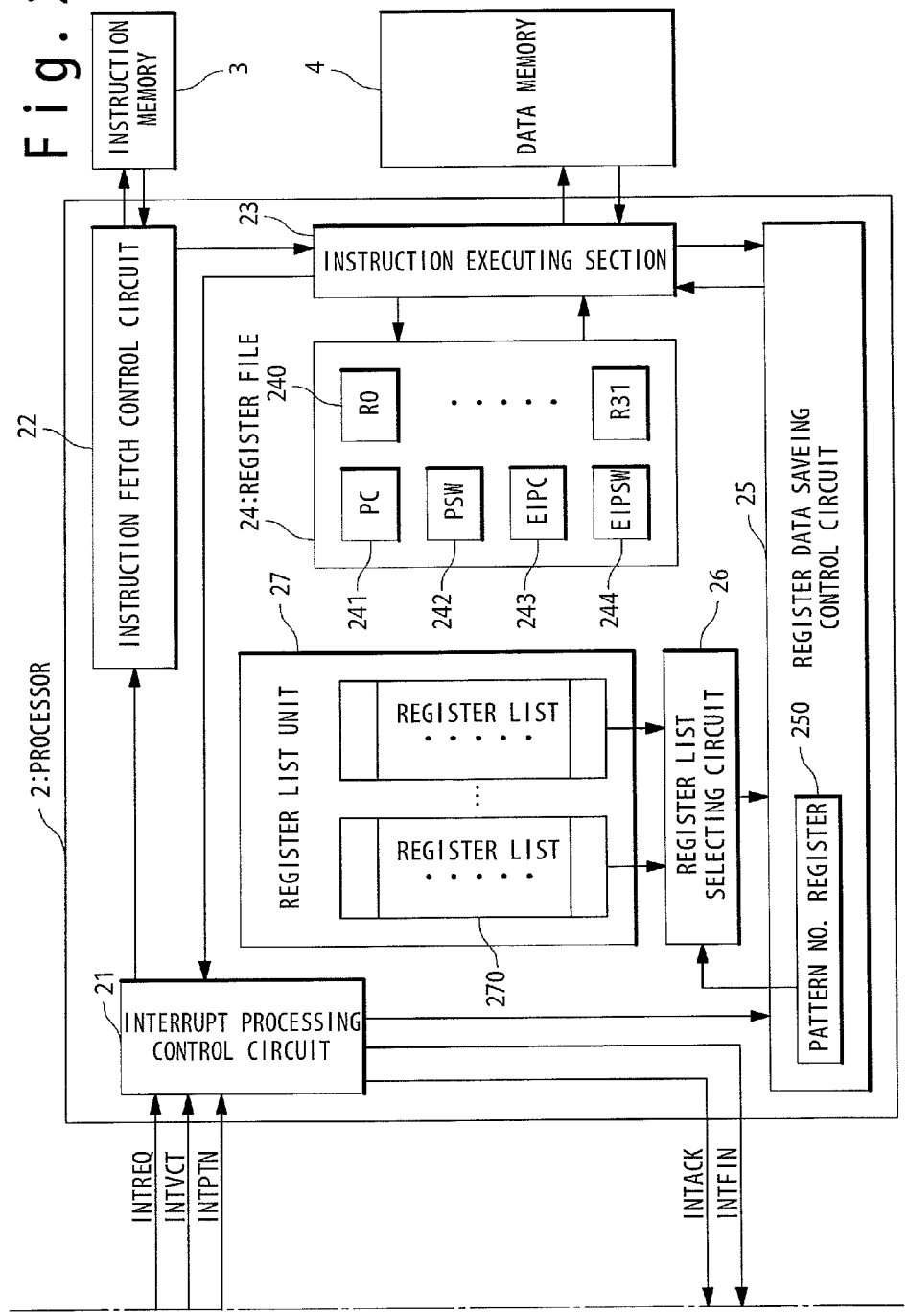

Fig. 3

| | | TYPE OF INSTRUCTION | | | |
|---|---|---|---|---|---|
| | | OS INTERRUPT | USER INTERRUPT A | USER INTERRUPT B | USER INTERRUPT C |
| | | INT0-15 | INT16-31 | INT32-47 | INT48-63 |
| DATA-SAVED REGISTER NO. | R0 | | v | | |
| | R1 | | v | | |
| | R2 | | v | | |
| | R3 | v | v | | v |
| | R4 | | v | | |
| | R5 | | | | |
| | R6 | | | | |
| | R7 | | | | |
| | R8 | | | | |
| | R9 | | | | |
| | R10 | | | v | v |
| | R11 | | | v | v |
| | R12 | | | v | v |
| | R13 | | | v | v |
| | R14 | | | v | v |
| | R15 | | | | |
| | R16 | | | | |
| | R17 | | | | |
| | R18 | | | | |
| | R19 | | | | |
| | R20 | v | | | |
| | R21 | v | | | |
| | R22 | v | | | |
| | R23 | v | | | |
| | R24 | v | | | |
| | R25 | v | | | |
| | R26 | v | | | |
| | R27 | v | | | |
| | R28 | v | | | |
| | R29 | v | | | v |
| | R30 | v | | | v |
| | R31 | v | | | v |
| | EIPC | | v | v | v |
| | EIPSW | | v | v | v |

Fig. 4     27

| BIT POSITION | REGISTER NO. | PTN | | | |
|---|---|---|---|---|---|
| | | 0 | 1 | 2 | 3 |
| 0 | R0 | 0 | 1 | 0 | 0 |
| 1 | R1 | 0 | 1 | 0 | 0 |
| 2 | R2 | 0 | 1 | 0 | 0 |
| 3 | R3 | 1 | 1 | 0 | 1 |
| 4 | R4 | 0 | 1 | 0 | 0 |
| 5 | R5 | 0 | 0 | 0 | 0 |
| 6 | R6 | 0 | 0 | 0 | 0 |
| 7 | R7 | 0 | 0 | 0 | 0 |
| 8 | R8 | 0 | 0 | 0 | 0 |
| 9 | R9 | 0 | 0 | 0 | 0 |
| 10 | R10 | 0 | 0 | 1 | 1 |
| 11 | R11 | 0 | 0 | 1 | 1 |
| 12 | R12 | 0 | 0 | 1 | 1 |
| 13 | R13 | 0 | 0 | 1 | 1 |
| 14 | R14 | 0 | 0 | 1 | 1 |
| 15 | R15 | 0 | 0 | 0 | 0 |
| 16 | R16 | 0 | 0 | 0 | 0 |
| 17 | R17 | 0 | 0 | 0 | 0 |
| 18 | R18 | 0 | 0 | 0 | 0 |
| 19 | R19 | 0 | 0 | 0 | 0 |
| 20 | R20 | 1 | 0 | 0 | 0 |
| 21 | R21 | 1 | 0 | 0 | 0 |
| 22 | R22 | 1 | 0 | 0 | 0 |
| 23 | R23 | 1 | 0 | 0 | 0 |
| 24 | R24 | 1 | 0 | 0 | 0 |
| 25 | R25 | 1 | 0 | 0 | 0 |
| 26 | R26 | 1 | 0 | 0 | 0 |
| 27 | R27 | 1 | 0 | 0 | 0 |
| 28 | R28 | 1 | 0 | 0 | 0 |
| 29 | R29 | 1 | 0 | 0 | 1 |
| 30 | R30 | 1 | 0 | 0 | 1 |
| 31 | R31 | 1 | 0 | 0 | 1 |
| 32 | EIPC | 0 | 1 | 1 | 1 |
| 33 | EIPSW | 0 | 1 | 1 | 1 |

Fig. 5

| INT NO. | PATTERN NO. REGISTER | INT NO. | PATTERN NO. REGISTER |
|---|---|---|---|
| 0 | 0 | 32 | 2 |
| 1 | 0 | 33 | 2 |
| 2 | 0 | 34 | 2 |
| 3 | 0 | 35 | 2 |
| 4 | 0 | 36 | 2 |
| 5 | 0 | 37 | 2 |
| 6 | 0 | 38 | 2 |
| 7 | 0 | 39 | 2 |
| 8 | 0 | 40 | 2 |
| 9 | 0 | 41 | 2 |
| 10 | 0 | 42 | 2 |
| 11 | 0 | 43 | 2 |
| 12 | 0 | 44 | 2 |
| 13 | 0 | 45 | 2 |
| 14 | 0 | 46 | 2 |
| 15 | 0 | 47 | 2 |
| 16 | 1 | 48 | 3 |
| 17 | 1 | 49 | 3 |
| 18 | 1 | 50 | 3 |
| 19 | 1 | 51 | 3 |
| 20 | 1 | 52 | 3 |
| 21 | 1 | 53 | 3 |
| 22 | 1 | 54 | 3 |
| 23 | 1 | 55 | 3 |
| 24 | 1 | 56 | 3 |
| 25 | 1 | 57 | 3 |
| 26 | 1 | 58 | 3 |
| 27 | 1 | 59 | 3 |
| 28 | 1 | 60 | 3 |
| 29 | 1 | 61 | 3 |
| 30 | 1 | 62 | 3 |
| 31 | 1 | 63 | 3 |

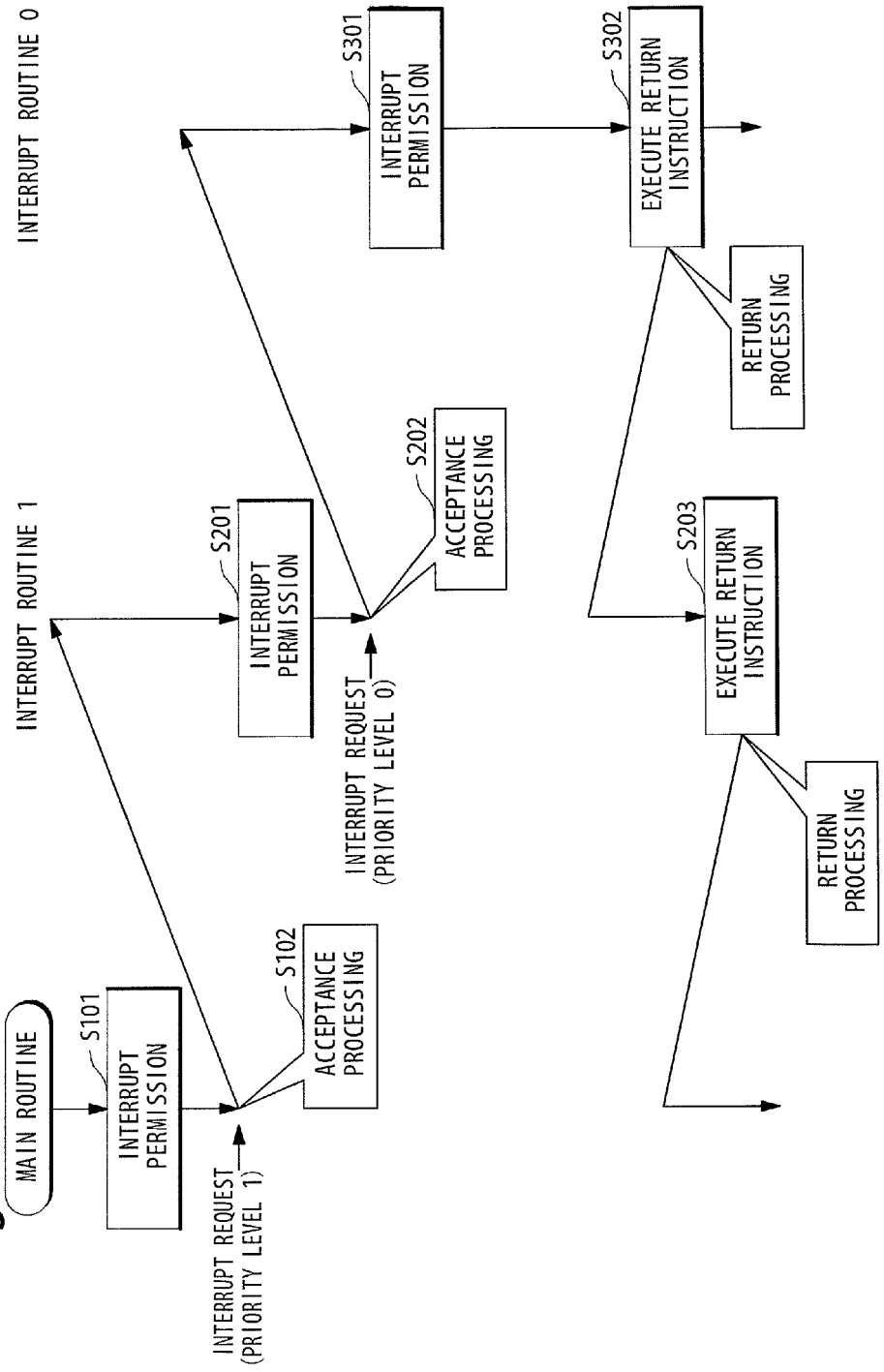

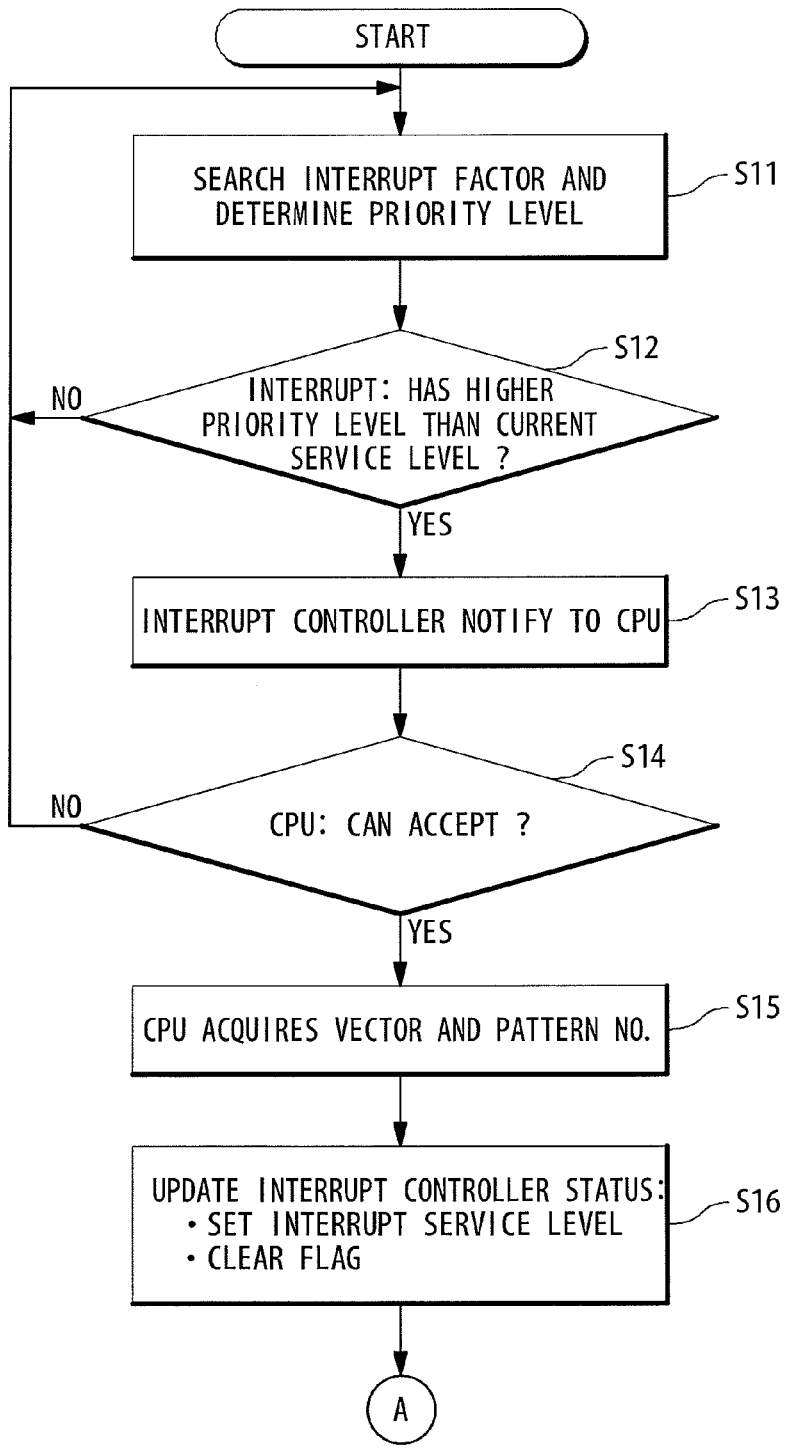

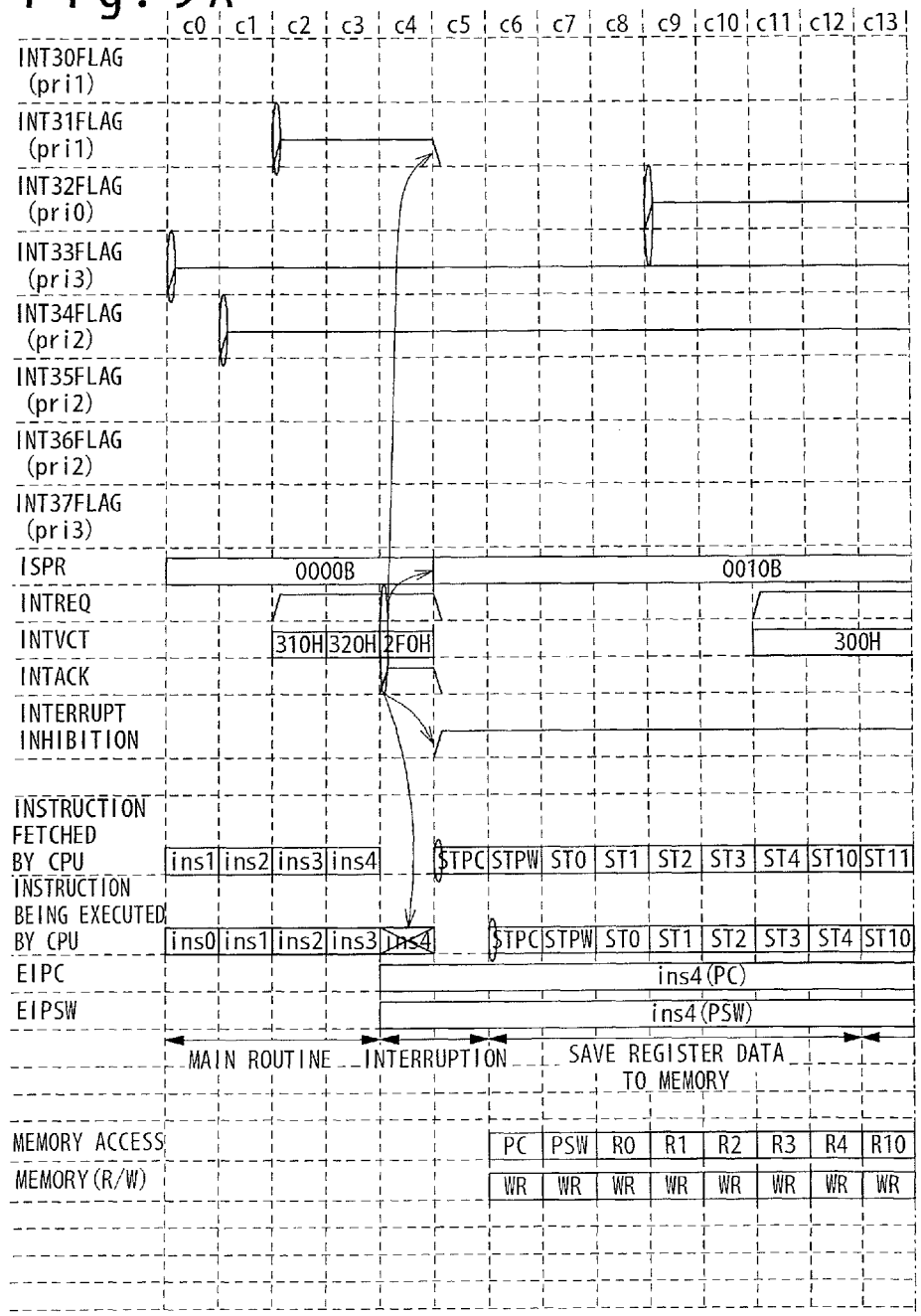

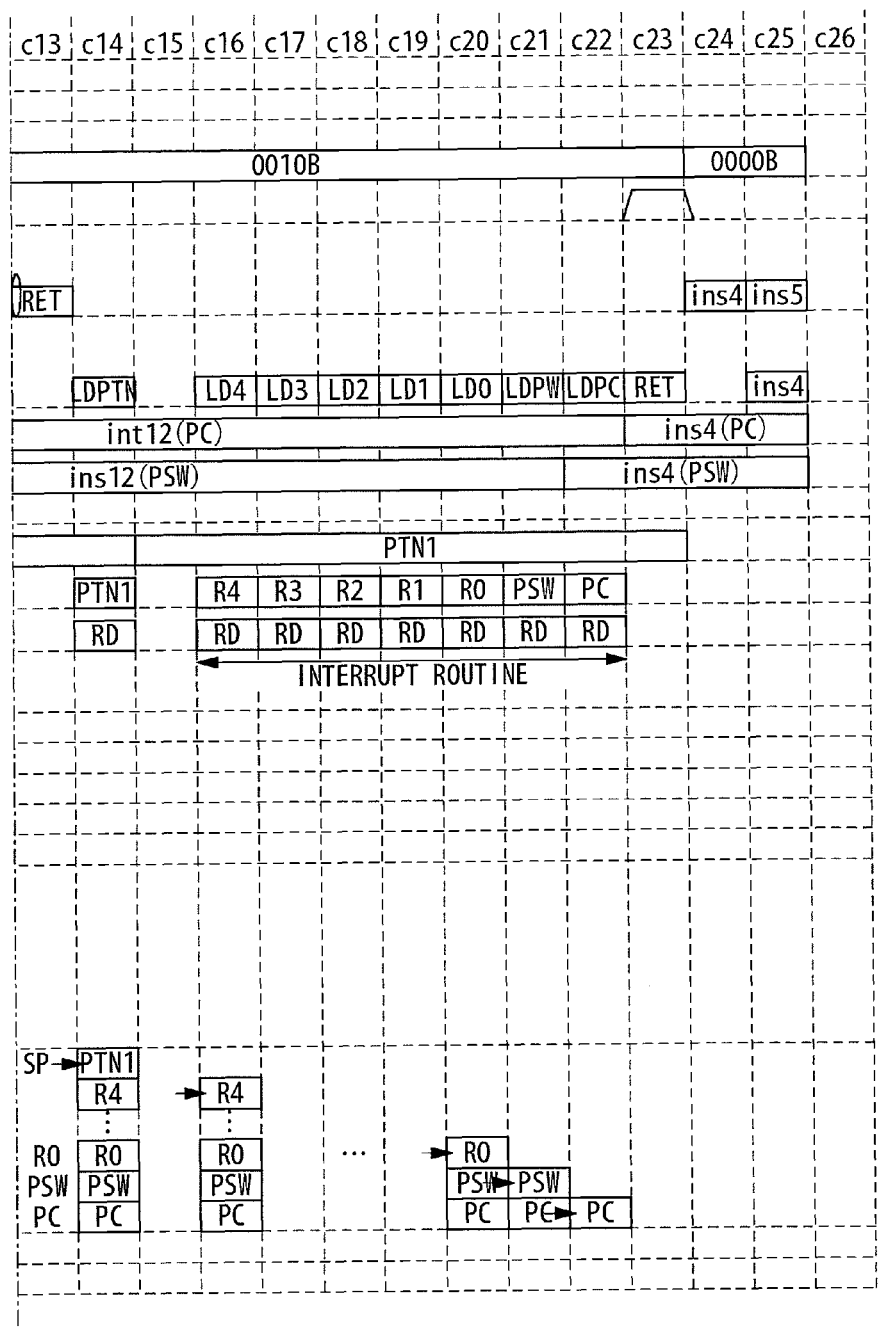

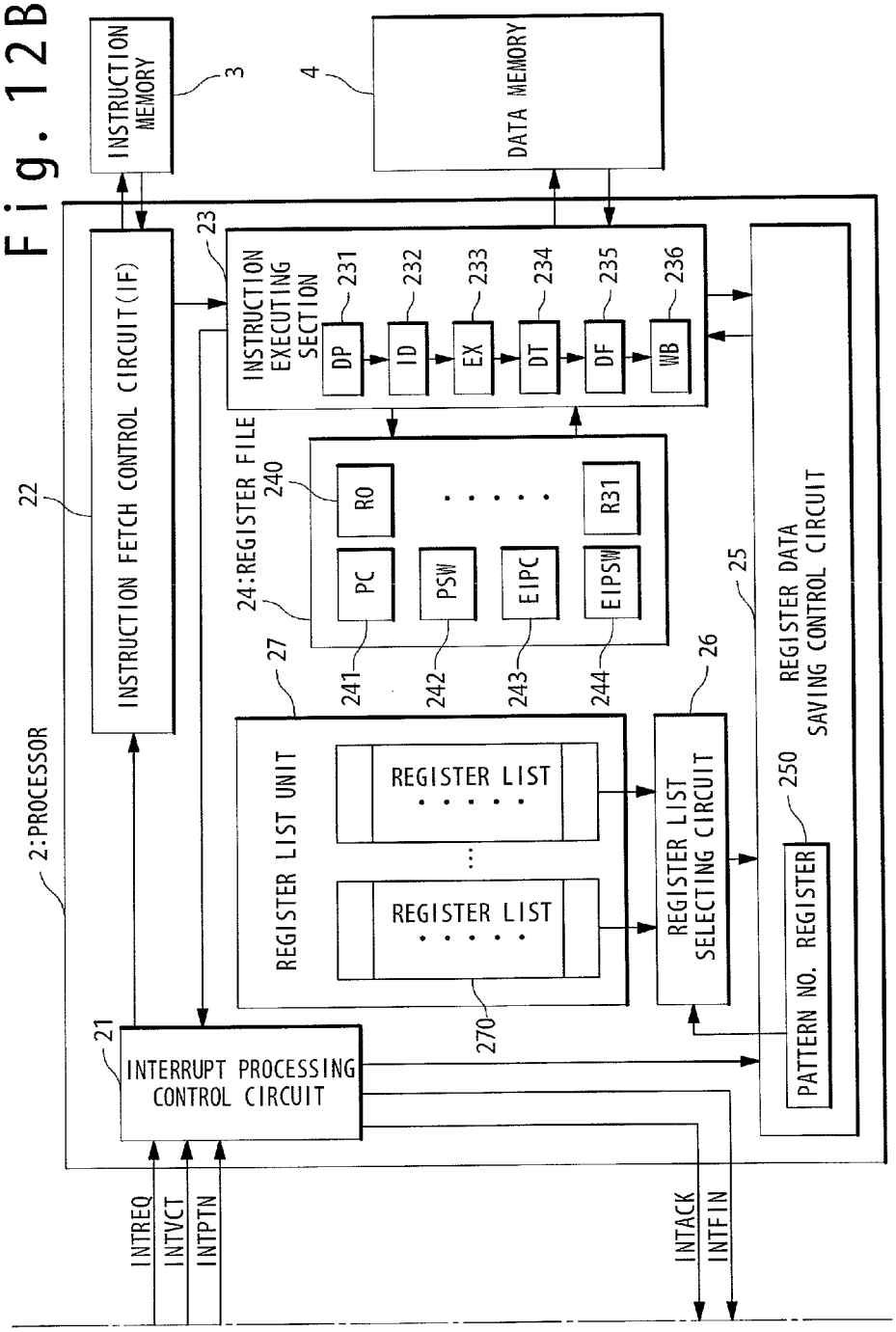

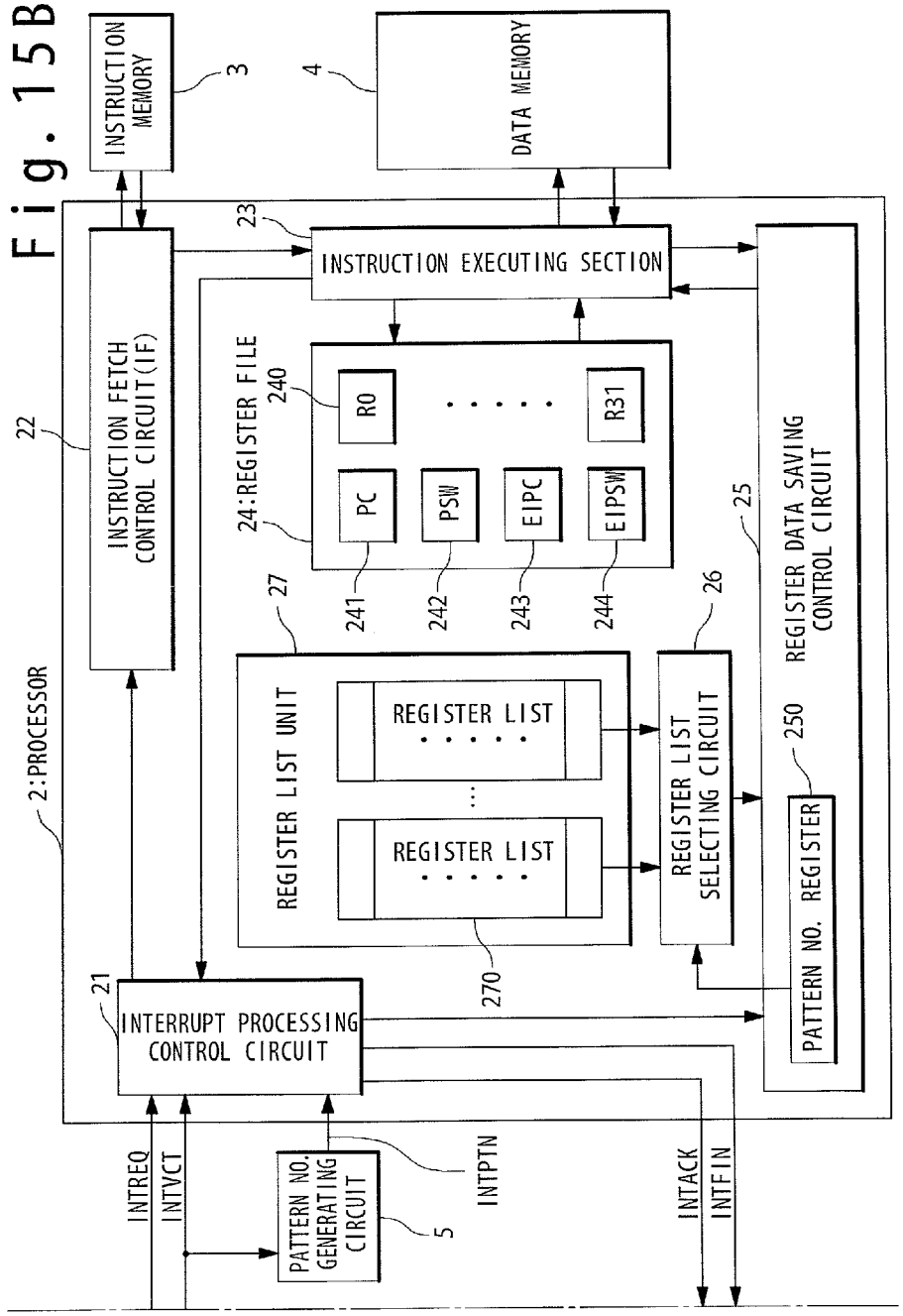

Fig. 16A

| INT NO. | INTVCT | PTN | INT NO. | INTVCT | PTN |
|---|---|---|---|---|---|
| 0 | 0100H | 0 | 32 | 0300H | 2 |
| 1 | 0110H | 0 | 33 | 0310H | 2 |
| 2 | 0120H | 0 | 34 | 0320H | 2 |
| 3 | 0130H | 0 | 35 | 0330H | 2 |
| 4 | 0140H | 0 | 36 | 0340H | 2 |
| 5 | 0150H | 0 | 37 | 0350H | 2 |
| 6 | 0160H | 0 | 38 | 0360H | 2 |
| 7 | 0170H | 0 | 39 | 0370H | 2 |
| 8 | 0180H | 0 | 40 | 0380H | 2 |
| 9 | 0190H | 0 | 41 | 0390H | 2 |
| 10 | 01A0H | 0 | 42 | 03A0H | 2 |
| 11 | 01B0H | 0 | 43 | 03B0H | 2 |
| 12 | 01C0H | 0 | 44 | 03C0H | 2 |
| 13 | 01D0H | 0 | 45 | 03D0H | 2 |
| 14 | 01E0H | 0 | 46 | 03E0H | 2 |
| 15 | 01F0H | 0 | 47 | 03F0H | 2 |
| 16 | 0200H | 1 | 48 | 0400H | 3 |
| 17 | 0210H | 1 | 49 | 0410H | 3 |
| 18 | 0220H | 1 | 50 | 0420H | 3 |
| 19 | 0230H | 1 | 51 | 0430H | 3 |
| 20 | 0240H | 1 | 52 | 0440H | 3 |
| 21 | 0250H | 1 | 53 | 0450H | 3 |
| 22 | 0260H | 1 | 54 | 0460H | 3 |
| 23 | 0270H | 1 | 55 | 0470H | 3 |
| 24 | 0280H | 1 | 56 | 0480H | 3 |
| 25 | 0290H | 1 | 57 | 0490H | 3 |
| 26 | 02A0H | 1 | 58 | 04A0H | 3 |
| 27 | 02B0H | 1 | 59 | 04B0H | 3 |
| 28 | 02C0H | 1 | 60 | 04C0H | 3 |
| 29 | 02D0H | 1 | 61 | 04D0H | 3 |
| 30 | 02E0H | 1 | 62 | 04E0H | 3 |
| 31 | 02F0H | 1 | 63 | 04F0H | 3 |

PROCESS AND METHOD FOR SAVING DESIGNATED REGISTERS IN INTERRUPT PROCESSING BASED ON AN INTERRUPT FACTOR

CROSS-REFERENCE TO RELATED APPLICATION

This is a continuation application of U.S. application Ser. No. 13/084,946, filed Apr. 12, 2011, which claims a priority on convention based on Japanese Patent Application No. 2010-91688 filed on Apr. 12, 2010. The disclosures of which are incorporated herein by reference in their entirety.

BACKGROUND

The present invention relates to a microcomputer for performing interrupt processing and an interrupt control method of a microcomputer, in particular, to a register data saving method in the interrupt processing.

In recent years, a microcomputer has been used in various electronic equipments including mobile electronic equipment such as portable phones, home use appliances, and electronic control devices for automobiles. With higher performances of such electronic equipment and computers, further improvement of processing capability of the microcomputer is demanded.

In a processor of the microcomputer, when an interrupt with a higher priority level than an instruction being executed is generated, the instruction being executed is interrupted and an interrupt sequence is executed. When interrupt processing is started, the processor temporarily saves in a stack memory, the data of a program status word (PSW) and a program counter (PC) and data of general purpose registers (context). After completion of the interrupt processing, the saved context can be returned to the PSW, the PC and the general purpose registers so as to restart the interrupted processing.

FIGS. 1A and 1B are block diagrams showing a configuration of a circuit related to the interrupt processing of a microcomputer according to a conventional example. Referring to FIGS. 1A and 1B, the interrupt processing according to the conventional example will be described in detail.

The microcomputer according to the conventional example includes an interrupt controller 100, a processor 200, an instruction memory 300 and a data memory 400. According to an inputted interrupt signal, the interrupt controller 100 sends an interrupt vector INTVCT and an interrupt request INTREQ to the processor 200. At this time, the interrupt controller 100 refers to a priority level PR set for every interrupt signal and outputs the interrupt vector IVCT with a higher priority level PR to the processor 200.

When the interrupt request INTREQ is set to "1", the processor 200 reads an instruction corresponding to the interrupt vector INVCT from the instruction memory 300 and executes the instruction. At this time, the processor 200 interrupts processing being executed and saves data (context) held by a register file 204 in the processing into the data memory 400.

In detail, the processor 200 includes an interrupt processing control circuit 201, an instruction fetch control circuit 202, an instruction executing section 203 and the register file 204. The interrupt processing control circuit 201 controls the execution of the interrupt processing as well as notifies acceptance of a request of the interrupt processing and completion of the interrupt processing to the interrupt controller 100. In response to an interrupt request INTREQ, the interrupt processing control circuit 201 controls the instruction fetch control circuit 202 to fetch the instruction corresponding to the interrupt vector INVCT. The instruction executing section 203 executes the instruction fetched by the instruction fetch control circuit 202 for the interrupt processing.

When starting the interrupt processing, the instruction executing section 203 saves data of the register file 204 in the data memory 400 (for example, a stack memory). Specifically, the instruction executing section 203 first saves data of the PC and the PSW into the data memory 400 and then, saves data of general purpose registers R0 to R31 into the data memory 400. When saving of the data of register file 204 is completed, the instruction executing section 203 executes processing corresponding to the interrupt request.

When ending the interrupt processing, the instruction executing section 203 returns the data saved into the data memory 400 into the register file 204 in response to a return instruction, and restarts the interrupted processing.

By saving the data of register file 204 and executing the interrupt processing, the interrupt processing can be executed by use of any general purpose registers without destroying the data of register file 204.

A range of the general purpose registers to be used in the interrupt processing is sometimes predetermined depending on data of the interrupt processing. However, in the conventional example, because the general purpose registers to be used in the interrupt processing cannot be designated, it is necessary to always designate all the registers having possibilities of use in the interrupt processing irrespective of data of the interrupt processing. For example, when the general purpose registers to be used in first interrupt processing are registers R0 to R4 and the general purpose registers to be used in second interrupt processing are registers R10 to R14, it is necessary to save data of the registers R0 to R4 and R10 to R14, even if the interrupt processing to be executed is the first interrupt processing. In this case, time taken to save the data of the registers R10 to R14 and a capacity of the memory used for saving are wasteful.

As described above, in the interrupt processing according to the conventional example, since the same registers are used for different interrupt factors, even data of the registers unnecessary to be saved are saved. For this reason, the time necessary for register data saving increases and a memory region necessary for the saving is required to be increased. Especially, as a frequency of interrupt processing increases, the register data saving takes a long time, to cause reduction in processing capability of a program.

In Patent literature 1, by providing a register usage identifier for identifying a register group used by a user program and designating saved registers based on the register usage identifier, the registers to be saved for the interrupt processing are determined. Thereby, the registers to be saved for the interrupt processing can be changed for each user program, so that time necessary for saving and return and a capacity of the memory used for saving are not wasted.

CITATION LIST

[Patent Literature 1]: JP H09-134292A

SUMMARY

According to an interrupt control method described in Patent literature 1, register data to be saved and an instruction sequence for performing saving and return of the register data are designated register usage identifiers set for each user program and the saving and return of register data for the user program are performed by executing the specified instruction sequence.

In Patent literature 1, the register data to be saved are specified based on preset register usage identifiers or the register usage identifiers corresponding to the program set at execution of the user program. For this reason, only the data of registers used by the program being executed can be saved irrespective of whether or not the register data are changed in the interrupt processing.

Generally, the number of registers used in a main routine is more than the number of registers used in a subroutine (interrupt handler) executed in the interrupt processing. For this reason, the number of registers designated based on the user program executed as the main routine is generally more than the number of registers used in the interrupt processing. Thus, when the registers data to be saved are determined based on the user program, there is a case that the register data that are not destroyed through the interrupt processing is saved, causing increase in a time for saving and a memory capacity for saving.

In addition, in Patent literature 1, since a saving instruction sequence and a return instruction sequence are prepared in a memory for each program, a memory capacity needs to increase. Especially, when interrupt nesting (multiple interrupts) is considered, it needs to prepare the register usage identifiers, the saving instruction sequence and the return instruction sequence for a program executing the interrupt processing. The identifiers and the instruction sequence suppress the memory region that can be used by another program, contributing to increase in the memory capacity.

A register data saving processing method when the interrupt nesting occurs is not described in Patent literature 1. If, like the user program, the register data to be saved are designated by using the register usage identifier corresponding to the interrupt processing being executed, processing of setting the register usage identifier needs to be performed each time an interrupt occurs, thereby increasing processing time of the processor.

Moreover, when the saving instruction sequence designated based on the register usage identifier is executed, it is necessary to fetch the instruction sequence from the memory. Especially, when the interrupt nesting occurs, processing delay due to fetch is accumulated for the number of times of interrupt processing, thereby decreasing processing capability of the processor.

In an aspect of the present invention, a microcomputer includes: a plurality of register lists having a plurality of register patterns, respectively, wherein each of plurality of register patterns designates registers, data of which are to be saved in a data memory; an instruction fetch control circuit configured to fetch instruction code from an instruction memory in response to an interrupt request issued based on occurrence of an interrupt factor; and a register data saving control circuit configured to acquire one register pattern from one of the plurality of register lists in response to the interrupt request, and issue a microinstruction based on the acquired register pattern in response to the interrupt request. An instruction executing section is configured to execute the microinstruction prior to the fetched instruction code, to save the data of registers designated based on the acquired register pattern in the data memory.

In another aspect of the present invention, an interrupt control method is achieved by setting a plurality of register patterns in a plurality of register lists, respectively, wherein each of plurality of register patterns designates registers, data of which are to be saved in a data memory; by fetching instruction code from an instruction memory by an instruction fetch control circuit in response to an interrupt request issued based on occurrence of an interrupt factor; by acquiring one register pattern from one of the plurality of register lists by a register data saving control circuit in response to the interrupt request; by issuing a microinstruction based on the acquired register pattern by the register data saving control circuit in response to the interrupt request; and by executing the microinstruction prior to the fetched instruction code by an instruction executing section, to save the data of registers designated based on the acquired register pattern in the data memory.

Therefore, according to the present invention, the amount of data saved in the interrupt processing can be reduced. Further, the interrupt processing time can be shortened. Furthermore, the time taken from reception of interrupt to start of saving of the context can be shortened.

BRIEF DESCRIPTION OF THE DRAWINGS

The above and other objects, advantages and features of the present invention will be more apparent from the following description of certain embodiments taken in conjunction with the accompanying drawings, in which:

FIGS. 2A and 2B are diagrams showing a configuration of a circuit block related to interrupt processing of a microcomputer according to a first embodiment of the present invention;

FIG. 3 is a diagram showing an example of a saving pattern set for each interrupt factor;

FIG. 4 is a diagram showing a setting example of a saved register pattern ID setting register unit according to the present invention;

FIG. 5 is a diagram showing a setting example of a PTN setting register according to the present invention;

FIG. 6 is a flowchart showing an example of an operation from interrupt reception to return according to the present invention;

FIGS. 7A and 7B are flowcharts showing details of an operation of interrupt processing according to the present invention;

FIGS. 9A and 9B show timing charts in the operation of interrupt processing according to a conventional example;

FIGS. 11A and 11B show timing charts in an operation of the return processing according to the first embodiment of the present invention;

FIGS. 12A and 12B are diagrams showing a configuration of the circuit block related to interrupt processing of the microcomputer according to a second embodiment of the present invention;

FIGS. 15A and 15B are diagrams showing a configuration of a circuit block related to interrupt processing of the microcomputer according to a third embodiment of the present invention;

FIG. 16A is a diagram showing a pattern number table used by a pattern number generating circuit in the third embodiment;

DETAILED DESCRIPTION (Summary)

Figure 1A:
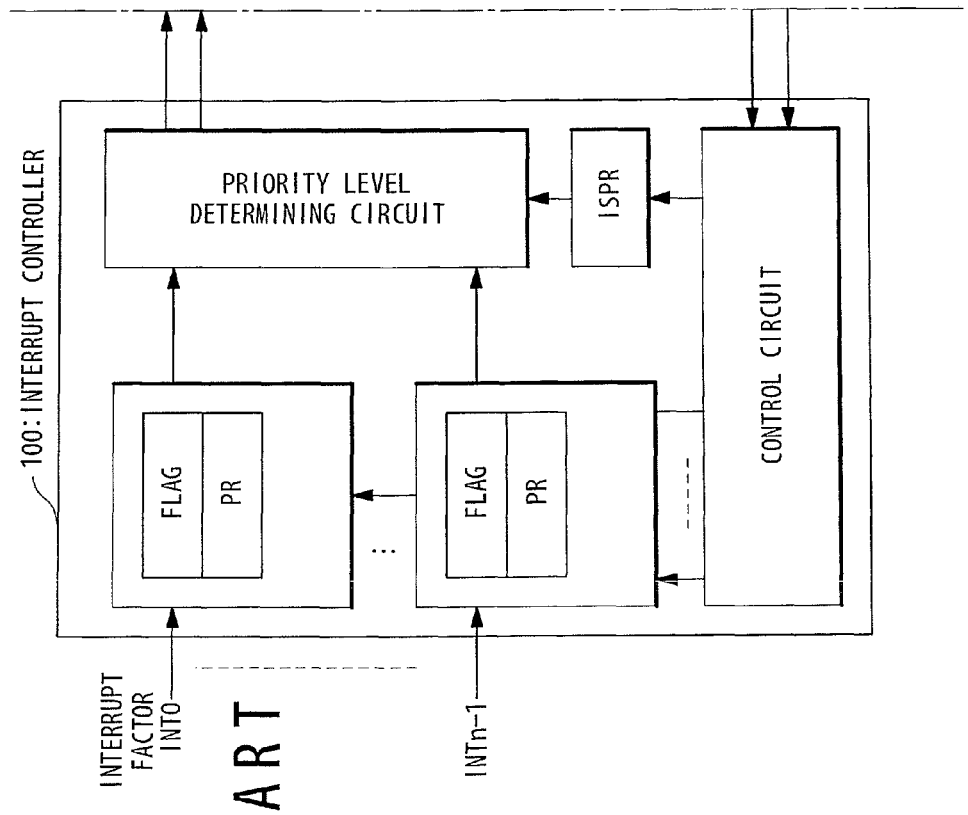
FIGS. 1A and 1B are diagrams showing a configuration of a circuit block related to interrupt processing of a conventional microcomputer.
Figure 1B:
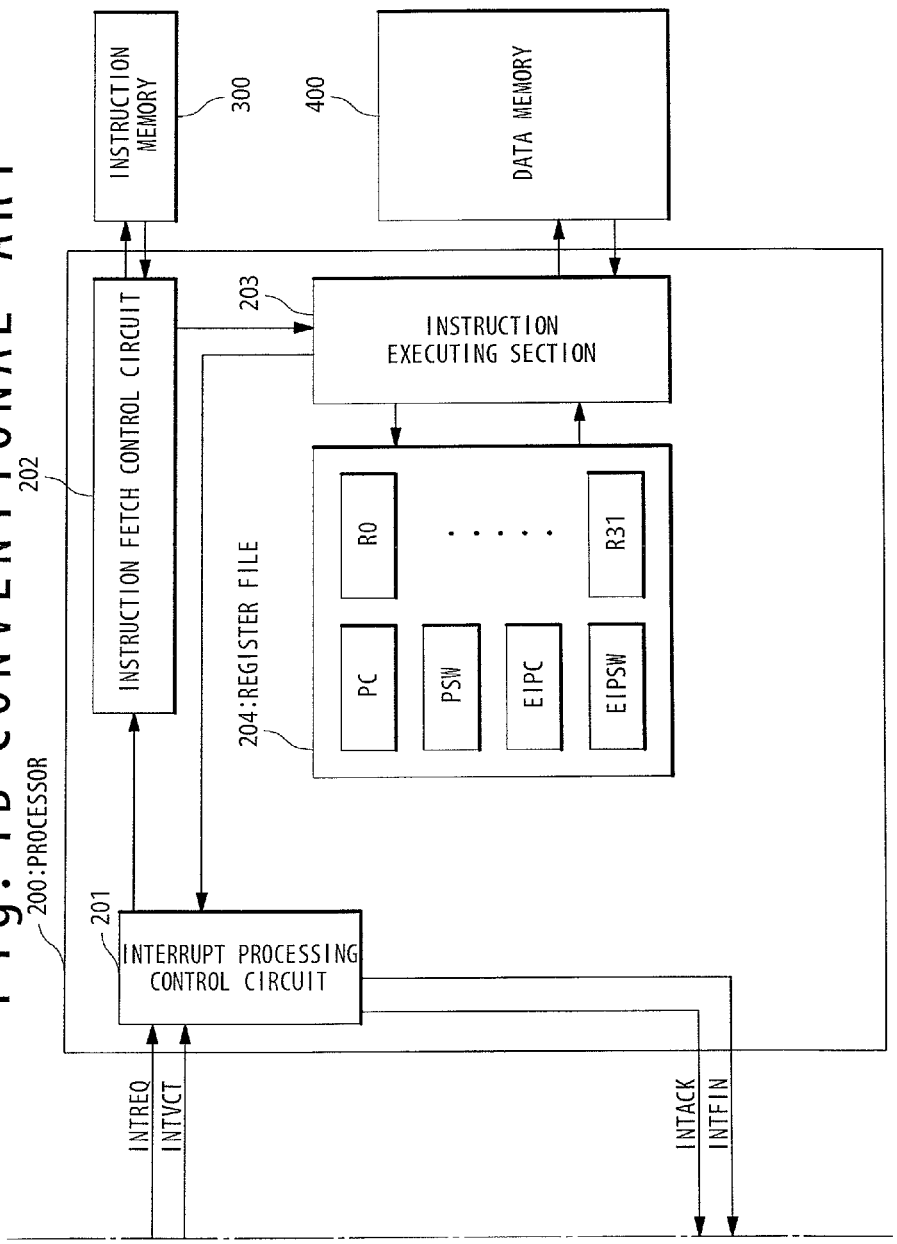

A microcomputer according to the present invention designates registers based on an identifier set for every interrupt factor and saves only data of the registers required to be saved in interrupt processing. Thereby, an amount of data saved in the interrupt processing becomes smaller than a conventional example, resulting in that a capacity of memory necessary the register data can be reduced and time taken to save the register data can be also reduced.

The microcomputer according to the present invention is provided with a register data saving control circuit for controlling register data save processing based on a microinstruction. The register data saving control circuit controls an instruction executing section in response to the microinstruction to save data of the registers, i.e. the context of a processor. While instruction code for the interrupt processing is fetched, the instruction executing section executes the microinstruction to save the context, i.e. the data of registers designated based on the identifier into a data memory. As a result, time taken from saving of the register data (context) to execution of the interrupt processing can be reduced, thereby improving utilization efficiency of the processor.

Next, the microcomputer according to the present invention will be described below in detail with reference to the attached drawings. In the drawings, the same or similar reference numerals are assigned to same or similar components.

[First Embodiment]

Figure 2A:
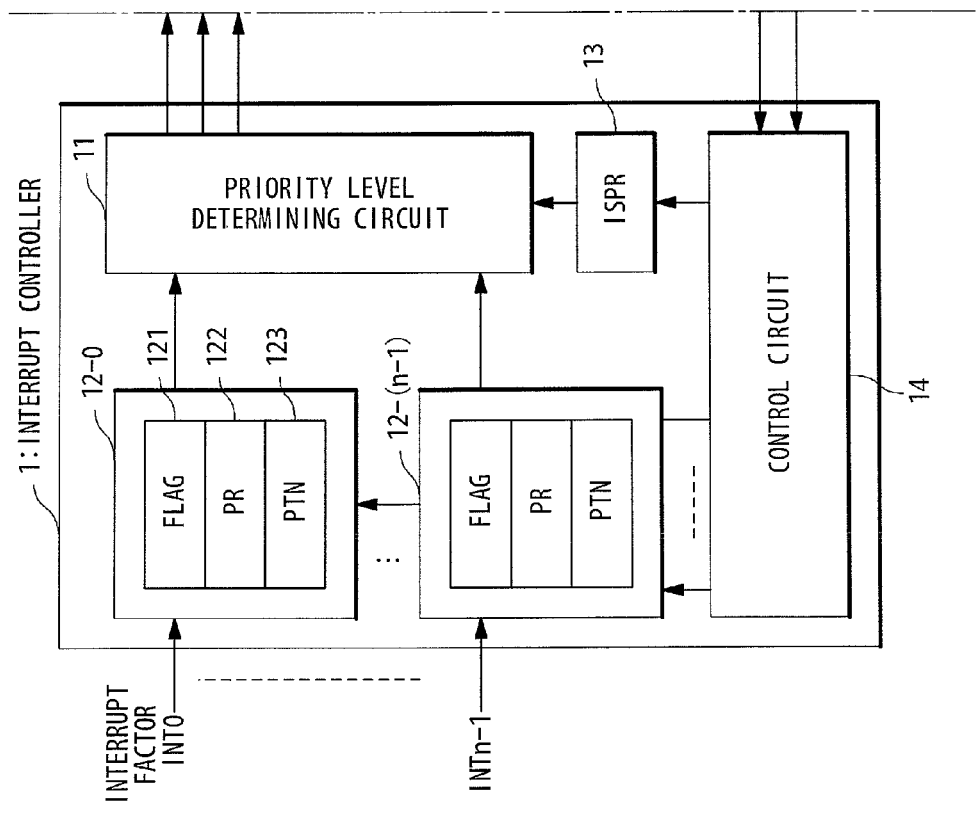

FIGS. 2A and 2B are diagrams showing a configuration of a circuit block related to interrupt processing in the microcomputer according to a first embodiment of the present invention. Referring to FIGS. 2A and 2B, the microcomputer in the first embodiment is provided with an interrupt controller (INTC) 1, a processor (CPU) 2, an instruction memory 3 and a data memory 4.

The interrupt controller 1 is provided with a priority level determining circuit 11, a plurality of interrupt factor register groups 12-0 to 12-(n−1), an ISPR register 13 and a control circuit 14. Here, n is an integer of 2 or more.

The plurality of interrupt factor register groups 12-0 to 12-(n−1) are connected to a plurality of interrupt signal lines INT0 to INTn−1, respectively. Each of the plurality of interrupt factor register groups 12-0 to 12-(n−1) is provided with a flag register 121, a priority level (PR) register 122 and a pattern number register (PTN register) 123.

The plurality of interrupt signal lines INT0 to INTn−1 are assigned to different interrupt factors, respectively, and interrupt signals are transmitted on the lines, respectively. Data determined based on the interrupt signal which is transmitted on each of the interrupt signal lines are set in a corresponding one of the interrupt factor register groups 12-0 to 12-(n−1).

That is, the data corresponding to different interrupt factors are set to the plurality of interrupt factor register groups 12-0 to 12-(n−1), respectively.

Specifically, a 1-bit interrupt factor flag indicating occurrence of the interrupt factor is set to the flag register 121. When the interrupt factor has occurred, the interrupt factor flag of "1" is set to the flag register 121, and when the interrupt processing for the interrupt factor is ended, "0" is set to the flag register 121. A priority level assigned to the interrupt factor is set to the priority level register 122. The priority level register 122 is a register having a bit size for the number of priority levels. For example, when any of four priority levels is set, the 2-bit priority level register 122 is provided in each of the plurality of interrupt factor register groups 12-0 to 12-(n−1).

The flag register 121 and the priority level register 122 have the same configuration as those of the conventional example. However, the interrupt controller 1 in the present embodiment is further provided with a pattern number register 123 in association with each interrupt factor (each of the interrupt signal lines INT0 to INTn−1). The register pattern number (PTN) as an identifier for identifying a register pattern corresponding to the interrupt factor is set in the pattern number register 123. Here, the register pattern is data designating the registers, data of which are to be saved, i.e., data-saved registers, when the interrupt factor has occurred. The register pattern is set in a register list, to be described later, for each interrupt factor and the same register pattern may be set for some interrupt factors.

For example, when four types of register pattern, e.g. "0", "1", "2", and "3", are set for the n interrupt signal lines INT (n interrupt factors), the 2-bit pattern number register 123 is provided in each of the plurality of interrupt factor register groups 12-0 to 12-(n−1), and any of four types of register patterns PTN is set to in a corresponding pattern number register 123. At this time, the number of interrupt factor signal lines may be four or more.

A service level (priority level) of current interrupt processing is set in an ISPR register 13. For example, the ISPR register 13 is configured from a 4-bit register. In this case, a bit position from the bottom correspond to one of priority levels "0", "1", "2", and "3", and data "1" is set in the bit position corresponding to the priority level of the interrupt processing. The priority level determining circuit 11 compares the priority level set in one flag register 121 with the priority level of the current interrupt processing, and controls the processor 2 to execute the processing with the higher priority level. Here, the priority level determining circuit 11 refers to the plurality of interrupt factor register groups 12-0 to 12-(n−1) to select the interrupt factor with the highest priority level among the priority levels set in the priority level registers 122, and compares the highest priority level with the priority level set to the ISPR register 13.

When the highest priority level is higher than the priority level of the current interrupt processing set in the ISPR register 13, the priority level determining circuit 1 sets an interrupt request INTREQ to "1" to request the interrupt factor, and issues an interrupt vector INTVCT (interrupt handler start address) of the selected interrupt factor to the processor 2, together with the interrupt request INTREQ. At this time, the priority level determining circuit 11 in the present embodiment outputs a register pattern number from the pattern number register 123 of the selected interrupt factor to the processor 2.

On the other hand, when all the priority levels of the interrupt factors with the flags set to "1" are equal to or lower than the priority level of the current interrupt processing, the priority level determining circuit 11 waits for outputting of the interrupt vector INTVCT corresponding to the interrupt factor. In this case, in response to completion of the current interrupt processing, the interrupt request INTREQ of the interrupt factor with the highest one of the priority levels of the interrupt factors with the flags set to "1" is outputted to the processor 2. At this time, the priority level determining circuit 11 in the present embodiment outputs the interrupt pattern number INTPTN from the pattern number register 123 to the processor 2, together with the interrupt vector INTVCT and the interrupt request INTREQ.

In response to an interrupt acceptance notice INTACK from the processor 2, the control circuit 14 sets the service level (priority level) of the interrupt processing to be executed by the processor 2 to the ISPR register 13. In response to an interrupt processing end notice INTFIN from the processor 2, the control circuit 14 resets the flag register 121 corresponding to the completed interrupt processing to "0".

The processor 2 is provided with an interrupt processing control circuit 21, an instruction fetch control circuit 22, an instruction executing section 23, a register file 24, a register data saving control circuit 25, a register list selecting circuit 26 and a register list unit 27.

The interrupt processing control circuit 21 controls execution of interrupt processing and outputs notices of acceptance of an interrupt request and completion of interrupt processing to the interrupt controller 1. In response to the interrupt request INTREQ, the interrupt processing control circuit 21 controls the instruction fetch control circuit 22 to fetch instruction code of an interrupt handler specified based on the interrupt vector INTVCT from the instruction memory 3.

The instruction executing section 23 executes the instruction code fetched by the instruction fetch control circuit 22 and microinstructions obtained from the register data saving control circuit 25. The instruction executing section 23 executes the microinstructions obtained from the register data saving control circuit 25 more preferentially than the fetched instruction code.

Specifically, in response to the multi-cycle microinstruction obtained from the register data saving control circuit 25, the instruction executing section 23 saves data of a part or whole of the register file 24 into the data memory 4. At this time, the register data saving control circuit 25 designates data-saved registers, from which data should be saved, for the instruction executing section 23 based on a register list selected by the register list selecting circuit 26.

When saving the data of register file 24 is completed, the instruction executing section 23 executes the instruction code fetched by the instruction fetch control circuit 22 for the interrupt processing.

The register data saving control circuit 25 is provided with a pattern number (PTN) register 250 that stores and holds the interrupt pattern number notified from the interrupt processing control circuit 21. When receiving the interrupt request INTREQ and the interrupt pattern number INTPTN from the interrupt processing control circuit 21, the register data saving control circuit 25 stores the interrupt pattern number INTPTN in the pattern number register 250 and outputs it to the register list selecting circuit 26. The register list selecting circuit 26 selects one of a plurality of register lists 270 from the register list unit 27 based on the register pattern number held in the pattern number register 250. In the selected register list 270, each of the register lists is associated with one register pattern number PTN and selects a register pattern of registers. The register list selecting circuit 26 extracts the register pattern from the selected register list 270 and outputs the register pattern to the register data saving control circuit 25.

The register data saving control circuit 25 is provided with a RAM (not shown) for storing a micro program of microinstructions for controlling register data saving processing and outputs the microinstructions containing the register pattern to the instruction executing section 23, thereby controlling the instruction executing section 23 to execute the register data saving processing based on the microinstructions.

The register file 24 includes a program counter (PC) register 241 that stores a program counter (PC), a PWS register 242 that stores a program status word (PSW), an EIPC register 243 for storing the PC in the interrupt processing, an EIPSW register 244 for storing the PSW in the interrupt processing, and a plurality of general purpose registers 240 (for example, 32-bit general purpose registers R0 to R31).

By such a configuration, the processor 2 accepts an interrupt request in an interrupt permission state and saves the data of registers into the data memory 4 based on the extracted register pattern.

Referring to FIGS. 3 to 5, a variation of the register pattern set for each interrupt factor will be described. FIG. 3 is a diagram showing an example of the register pattern set for each interrupt factor. Here, the following four register patterns are illustrated.

(1) 16 interrupt signal lines INT0 to INT15 are used for OS interruption. In this case, data of 13 general-purpose registers R3, and R20 to R31 that may be destroyed by the OS, are necessary to be saved, and this register pattern is set in the register list 270 to designate these registers as data-saved registers.

(2) 16 interrupt signal lines INT16 to INT31 are used for user interruption A. In this case, data of seven registers, i.e. the data of the general purpose registers R0 to R4, the EIPC register 243 and the EIPSW register 244 that may be destroyed by an interrupt handler are necessary to be saved, and this register pattern is set in the register list 270 to designate these registers as data-saved registers.

(3) 16 interrupt signal lines INT32 to INT47 are used for user interruption B. In this case, data of seven registers, i.e. the data of the general purpose registers R10 to R14, the EIPC register 243 and the EIPSW register 244 that may be destroyed by the interrupt handler are necessary to be saved, and this register pattern is set in the register list 270 to designate these registers as data-saved registers.

(4) 16 interrupt signal lines INT48 to INT63 are used for user interruption C. In this case, data of 10 registers, i.e. the data of the general purpose registers R3, R10 to R14, R29 to R31), the EIPC register 243 and the EIPSW register 244 that may be destroyed by the interrupt handler are necessary to be saved, and this register pattern is set in the register list 270 to designate these registers as data-saved registers.

The above-mentioned register patterns (1) to (4) are associated with the register pattern numbers "0", "1", "2", "3", respectively. FIG. 4 is a diagram showing an example of the register list unit 27 according to the present embodiment. The register list 270 includes a register pattern as data indicating registers associated with the register pattern number PTN. In the example shown in FIG. 4, the register list unit 27 is configured from four register lists, each of which is associated with either of four register pattern numbers PTN. The register list 270 includes flip-flops for 34 bits, and bit positions correspond to the general purpose registers R0 to R31, the EIPC register 243 and the EIPSW register 244, respectively.

In the register list 270, "1" is set to the bit position corresponding to a data-saved register and "0" is set to the bit position corresponding to a data-unsaved register. Thus, the register pattern can be set in the register list 270. Since each register list 270 in the register list unit 27 is provided for one register pattern number PTN, the register pattern can be uniquely identified by the register pattern number PTN. In the example shown in FIG. 4, the register patterns (1) to (4) are associated with the register pattern numbers PTN "0" to "3", respectively, and set in the register list unit 27.

For example, when the interrupt pattern number INTPTN of "1" is notified to the processor 2, the register list 270 with the register pattern number of "1" is selected and the data of the registers of the selected register pattern are saved into the data memory 4.

In the interrupt controller 1 in the present embodiment, the register pattern number PTN is set for each interrupt factor (interrupt signal line). FIG. 5 is a diagram showing an example of the pattern number register 123 according to the present embodiment. In the example shown in FIG. 5, 2-bit pattern number register 123 is provided for each of 64 interrupt signal lines INT0 to INT63, and the register pattern number PTN corresponding to the interrupt factor is set to each of the interrupt signal lines. Here, the register pattern number of "0" is set to the interrupt signal lines INT0 to INT15, the register pattern number of "1" is set to the interrupt signal lines INT16 to INT31, the register pattern number of "2" is set to the interrupt signal lines INT32 to INT47, and the register pattern number of "3" is set to the interrupt signal lines INT48 to INT63.

In response to occurrence of the interrupt factor, the interrupt controller 1 in the present embodiment acquires the register pattern number PTN for the interrupt signal line and notifies the register pattern number as an interrupt pattern number INTPTN to the processor 2. Based on the notified interrupt pattern number INTPTN, the register data saving control circuit 25 can start interrupt acceptance processing, and designates the data-saved registers (register pattern) and perform the register data saving processing.

Next, referring to FIGS. 6 to 11B, details of an operation in the interrupt processing according to the first embodiment will be described.

FIG. 6 is a flowchart showing an example of the operation from the interrupt acceptance processing to return processing according to the present invention. Referring to FIG. 6, an example of a multiple interrupt operation from the interrupt acceptance processing to the return processing to a main routine will be described.

When an interrupt request is permitted during execution of the main routine stored in the instruction memory 3, the interrupt request with the highest priority level in a current state is accepted (Steps S101, S102). Here, since the priority level "1" of a requested interrupt factor is higher than the service level (priority level) of the main routine being executed, the processor 2 accepts the interrupt request, branches to an interrupt handler stored in the instruction memory 3, and executes an interrupt routine 1. At this time, the processor 2 saves the register data uniquely determined based on the requested interrupt factor into the data memory 4.

When a new interrupt request is permitted during execution of the interrupt routine 1, and the highest priority level of the new interrupt request is higher than the service level (priority level) of the interrupt routine 1, the new interrupt request is accepted (Steps S201, S202). Here, since the priority level "0" of the new interrupt request is higher than the priority level "1" of the interrupt routine 1 being executed, the processor 2 accepts the new interrupt request, branches to the interrupt handler and executes an interrupt routine 2. At this time, the processor 2 saves the register data uniquely into the data memory 4 in response to the accepted interrupt request.

When the interrupt request is permitted during execution of the interrupt routine 2 and then, the interrupt routine 2 ended, the processor 2 executes a return instruction (RET instruction) of the interrupt handler (Steps S301, S302). Here, the data saved into the data memory 4 at Step S202 are returned to the register file 24 and the suspended interrupt routine 1 is restarted.

When the interrupt routine 1 is ended, the processor 2 executes the return instruction (RET instruction) of the interrupt handler (Step S203). Here, the data saved into the data memory 4 at Step S102 are returned to the register file 24 and the suspended main routine is restarted.

As described above, according to the present embodiment, in the multiple interrupt processing, a context of the data-saved registers (i.e. register data) corresponding to the interrupt factor are saved in response to each of interrupt requests. For this reason, saving of the register data that may not be destroyed in the interrupt processing is prevented, thereby reducing an amount of saved data.

Referring to FIGS. 7A to 8B, details of an operation in the interrupt acceptance processing according to the present embodiment will be described. Here, as an example, it is assumed that the register patterns and the register pattern numbers PTN shown in FIGS. 3 to 5 have been set to the microcomputer.

Figure 7B:
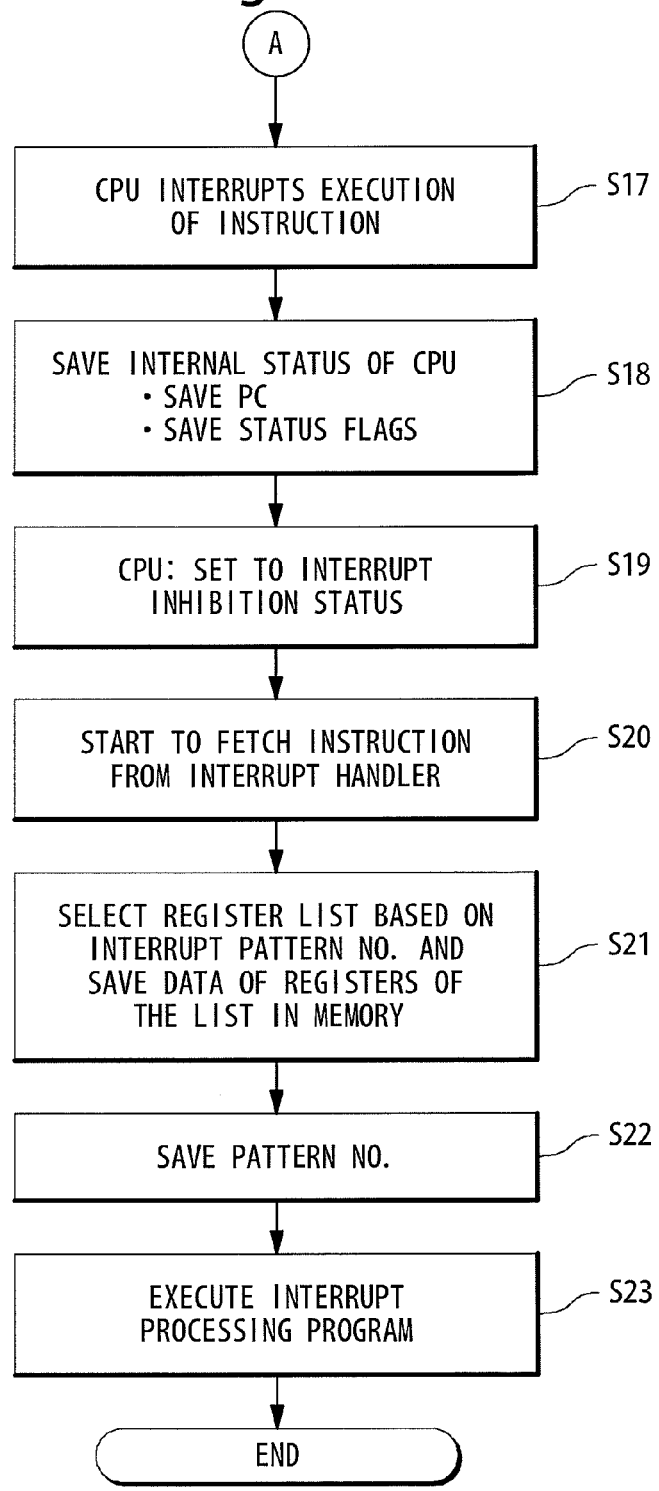

FIGS. 7A and 7B are flowcharts showing details of an operation in the interrupt acceptance processing at Steps S102 and S202 shown in FIG. 6.

Referring to FIGS. 7A and 7B, the interrupt controller 1 searches the flag registers of the interrupt factor register groups to detect the interrupt factor and performs comparison of the priority level of the detected interrupt factor (Step S11). Here, the interrupt controller 1 selects the highest priority level among the priority levels of the interrupt factors with "1" set in the flag registers 121 and determines whether or not the selected priority level is higher than the service level (priority level) of the current processing being executed.

When the selected priority level is higher than the current service level, the interrupt controller 1 sets "1" to the interrupt request INTREQ corresponding to the interrupt factor of the selected priority level and outputs the interrupt vector INTVCT and the interrupt pattern number INTPTN corresponding to the interrupt factor (Yes at Steps S12 and S13). On the other hand, when the selected priority level is not higher than the current service level, the interrupt controller 1 returns to Step S11 (No in Step S12).

When the interrupt request to the processor 2 is permitted (interrupt inhibition flag DI in the PSW="0"), the processor 2 acquires the interrupt vector INTVCT and the interrupt pattern number INTPTN in response to the interrupt request INTREQ (Yes in Steps S14 and S15). At this time, the processor 2 notifies to the interrupt controller 1, an interrupt acceptance notice INTACK indicating that the interrupt request INTREQ is accepted. On the other hand, when the interrupt request to the processor 2 is inhibited (interrupt inhibition flag DI in the PSW="1"), the processor 2 proceeds to Step S11 (No at Step S14).

In response to an interrupt acceptance notice INTACK, the interrupt controller 1 sets the service level (priority level) of the interrupt request accepted by the processor 2 to the ISPR register 13 and resets the flag register 121 corresponding to the accepted interrupt request to "0" (Step S16).

After Step S15, the processor 2 interrupts execution of a currently executing instruction in response to the interrupt request INTREQ, and enters an interrupt inhibition state (Steps S17 to S19). More specifically, in a case of the interrupt permission state, the processor 2 interrupts execution of the currently executing instruction in response to the interrupt request INTREQ, and stores the PC and the PSW at the interruption in the EIPC register 243 and the EIPSW register 244, respectively (Steps S17, S18). Thus, the internal state of the processor 2 prior to execution of the interrupt processing is stored.

When the internal state is stored, the processor 2 sets the interrupt inhibition state (interrupt inhibition flag DI in the PSW="1") (Step S19). The processor 2 starts fetching of the interrupt handler designated based on the interrupt vector INTVCT (Step S20). Further, the register pattern corresponding to the interrupt pattern number INTPTN is selected and data of the registers of the selected register pattern are saved into the data memory 4 based on the microinstructions from the register data saving control circuit 25 (Step S21). Processing at Step S19 to S21 is started at the same timing.

When saving of the register data of the register pattern corresponding to the interrupt pattern number INTPTN is ended, the processor 2 saves the register pattern number PTN corresponding to the interrupt pattern number INTPTN into the data memory 4 (Step S22).

When saving of the register data and the register pattern number PTN is ended, the processor 2 executes the fetched interrupt handler (Step S23). The interrupt acceptance processing is ended by starting the interrupt processing.

As described above, according to the present invention, in response to occurrence of the interrupt factor, the priority level is determined and the register data corresponding to the accepted interrupt request are saved while the interrupt handler is fetched.

According to the present invention, since the data-saved registers are uniquely identified based on the register pattern number PTN, only the data of registers that may be destroyed through the interrupt processing can be selected and saved. Thus, the memory capacity can be reduced and time necessary for saving can be also reduced. Moreover, since the register data saving processing is achieved by executing the micro program in the register data saving control circuit 25, it is unnecessary to fetch the instructions from the instruction memory 3. For this reason, time necessary to fetch a saving instruction can be reduced, thereby time necessary for the saving processing can be reduced.

Figure 8A:
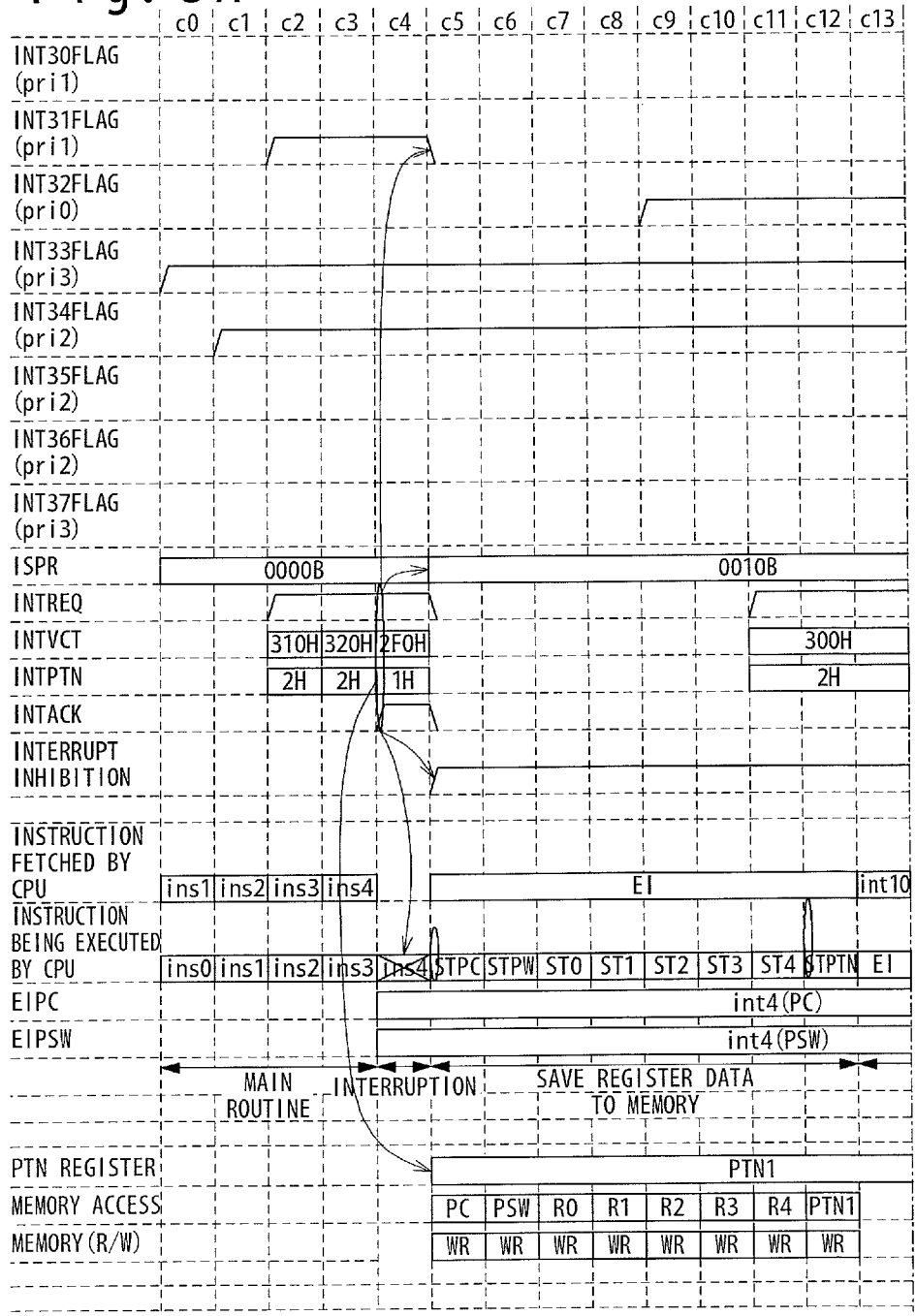
FIGS. 8A and 8B show timing charts in the operation of interrupt processing according to the first embodiment of the present invention.
Figure 8B:
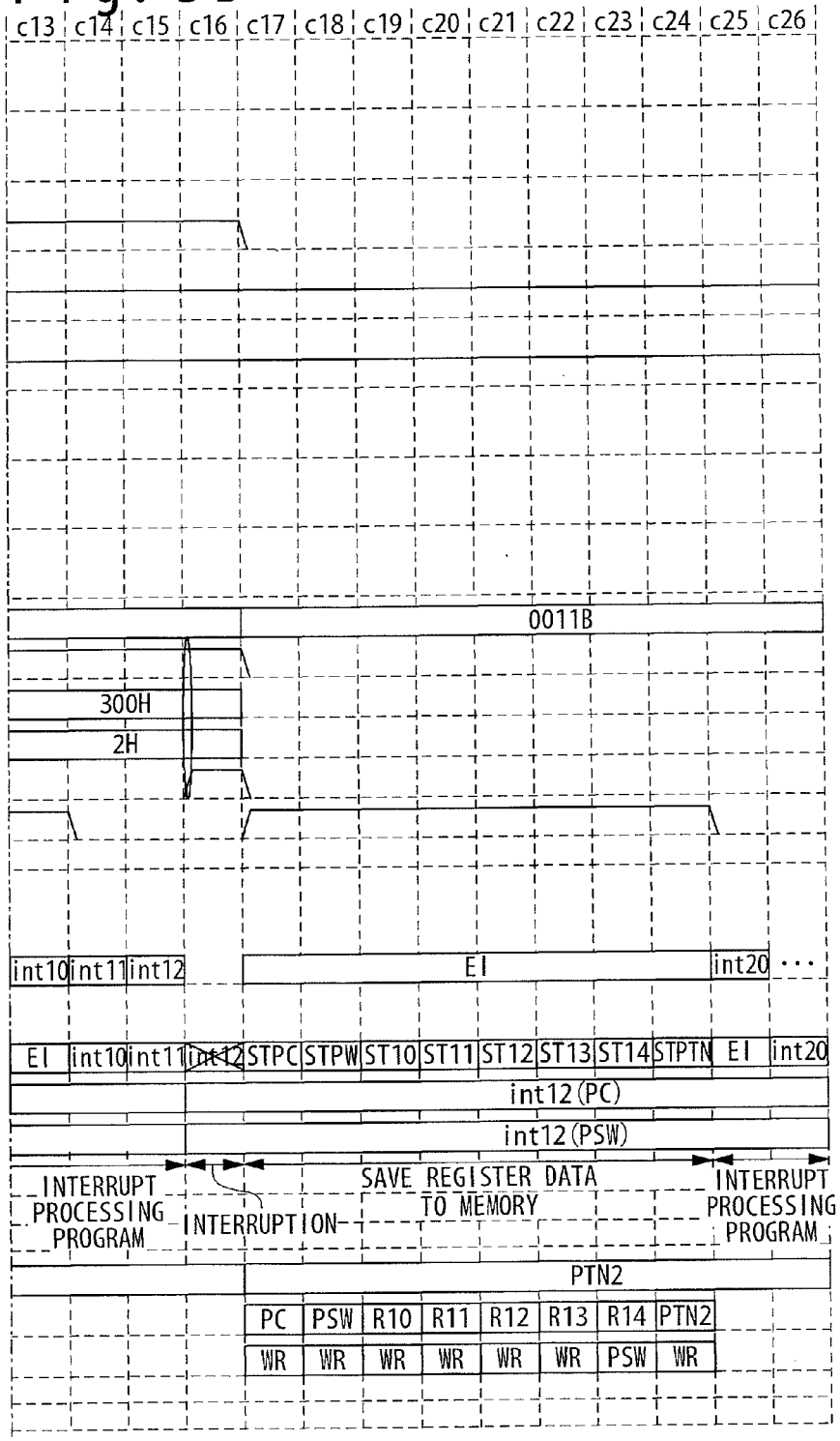

FIGS. 8A and 8B show timing charts in the operation of the interrupt processing according to the first embodiment of the present invention. Referring to FIG. 8A and FIG. 8B, details of operation of the interrupt processing in the first embodiment will be described. Here, the operation when multiple interrupt requests are issued will be described in which the interrupt request with the priority level of "1" is issued and then the interrupt request is issued to have the priority level of "0" that is higher than the priority level of "1". Here, it is assumed that the register pattern, the register list unit 27 and the pattern number register 123 are set as shown in FIGS. 3 to 5. The priority levels set in the priority level registers 122 corresponding to the interrupt factors are as follows. That is, the priority level of "1" (Pri1) is assigned to the interrupt factors INT30 to INT31, the priority level of "0" (Pri0) is assigned to the interrupt factor INT 32, the priority level of "2" (Pri2) is assigned to the interrupt factors INT34 to INT36 and the priority level of "3" (Pri3) is assigned to the interrupt factors INT33 and INT37.

First, at the clock C0, the interrupt factor signal INT33 of the priority level "3" (Pri3) is inputted to the interrupt controller 1. At this time, it is assumed that "0000B" is set to the ISPR register 13 (no current interrupt processing) and no interrupt factor other than the interrupt factor signal INT33 occurs. For this reason, the interrupt controller 1 notifies occurrence of the interrupt factor INT33 to the processor 2 at the clock C2 after occurrence of the interrupt factor INT33 by two clocks. Here, "1" is set to the interrupt request flag INTREQ, and "310H" as the interrupt vector INTVCT and "2H" as the register pattern number INTPTN are outputted.

At the clock C1, the interrupt factor signal INT34 with the priority level "2" (Pri2) is inputted to the interrupt controller 1. At this time, the ISPR register 13 is in the state of "0000B" (no current interrupt processing), and the interrupt factor signal INT34 has the highest priority level among the other occurred interrupt factors. For this reason, the interrupt controller 1 notifies the occurrence of the interrupt factor INT34 to the processor 2 at the clock C3 after occurrence of the interrupt factor INT34 by two clocks. Here, "1" is set to the interrupt request flag INTREQ, and "320H" as the interrupt vector INTVCT and "2H" as the register pattern number INTPTN are outputted.

At the clock C2, the interrupt factor signal INT31 with the priority level "1" (Pri1) is inputted to the interrupt controller 1. At this time, the ISPR register 13 is in the state of "0000B" (no current interrupt processing), and the interrupt factor signal INT31 has the highest priority level among the other occurred interrupt factors. For this reason, the interrupt controller 1 notifies the occurrence of the interrupt factor INT31 to the processor 2 at the clock C4 after occurrence of the interrupt factor INT31 by two clocks. Here, "1" is set to the interrupt request flag INTREQ, and "2F0H" as the interrupt vector INTVCT and "1H" as the register pattern number INTPTN are outputted.

During the clocks C0 to C3, although the processor 2 is in the interrupt permission state, the interrupt request cannot be accepted due to the internal status of the processor 2. In this state, the interrupt factors INT33 and INT34 are not accepted. At the clock C4, when the processor 2 enters the interrupt acceptance state, the processor 2 accepts the interrupt vector INTVCT "2F0H" (interrupt factor INT31) outputted from the interrupt controller 1 and returns the interrupt acceptance notice INTACK to the interrupt controller 1.

At the clock C4, when the interrupt request is accepted, the internal status of the processor 2 (values of the PC and the PSW: ins4 (PC) and ins4 (PSW)) are stored in the EIPC register 243 and the EIPSW register 244.

At the clock C5, in the interrupt controller 1, the flag register 121 of the interrupt factor INT31 is cleared in response to the interrupt acceptance notice INTACK. Further, the second lower bit of the ISPR register 13 is set to "1" ("0010B") in response to the priority level "Pri1" of the interrupt factor INT31. Further, in the processor 2 that outputs the interrupt acceptance notice INTACK, "1" is set to the interrupt inhibition flag DI in the PSW, setting to the interrupt inhibition state.

At the clock C5, under control of the interrupt processing control circuit 21 that accepts the interrupt request, the instruction fetch control circuit 22 fetches an instruction (EI instruction) of the interrupt handler from the instruction memory 3 and the register data saving control circuit 25 starts the register data saving processing. At this time, the interrupt pattern number PTN of "1H" (PTN1) is set to the pattern number register 250.

More specifically, the register data saving control circuit 25 extracts the register pattern from the register list unit 27 based on the pattern number INTPTN of "1H" (PTN1) set in the pattern number register 250. Then, the register data saving control circuit 25 supplies a multi-cycle microinstruction containing the extracted register pattern to the instruction executing section 23. The instruction executing section 23 makes a fetched EI instruction to be waited and first executes the multi-cycle microinstruction supplied from the register data saving control circuit 25. Thus, in the clocks C5 to C11, the data of the EIPC register 243, the EIPSW register 244 and the general purpose registers R0, R1, R2, R3, R4, which are contained in the register pattern designated based on the interrupt pattern number INTPTN "1H" (PTN1), are saved into the data memory 4. Also, at a clock C12, the register pattern number PTN1 of "1H" is saved into the data memory 4.

When ending saving of the data of registers of the designated register pattern, the instruction executing section 23 executes the fetched EI instruction (interrupt permission instruction) at a clock C13. Subsequently, instruction code is fetched from an address of the interrupt handler designated by the interrupt vector "2F0H" and the interrupt handler is executed by the instruction executing section 23. Through execution of the EI instruction at the clock C13, the interrupt inhibition state is released at a next clock C14.

According to the present invention, although the EI instruction is fetched at the clock C5 immediately after the interrupt request is accepted, the microinstruction supplied from the register data saving control circuit 25 is executed at the clock C5 without executing the EI instruction.

At the clock C9, the interrupt factor signal INT32 with the priority level of "0" (Pri0) is inputted. At this time, the ISPR is in the state of "0010B" (indicating the interrupt processing with the service level Pri1), and the interrupt factor signal INT32 shows the highest priority level among the other occurred interrupt factors. For this reason, the interrupt controller 1 notifies occurrence of the interrupt factor INT31 to the processor 2 at the clock C11 after occurrence of the interrupt factor INT32 by two clocks. Here, "1" is set to the interrupt request INTREQ, and "300H" as the interrupt vector INTVCT and "2H" as the register pattern number INTPTN are outputted.

When the processor 2 is set to the interrupt permission state due to execution of the EI instruction at the clock C14 and is set to the interrupt acceptance state at a clock C16, the processor 2 accepts the interrupt vector INTVCT "300H" (interrupt factor INT32) outputted from the interrupt controller 1 and returns the interrupt acceptance notice INTACK to the interrupt controller 1.

Subsequently, as in the clocks C4 to C13, the current interrupt processing is interrupted and the register data saving processing and the interrupt processing for the interrupt factor INT32 are executed.

More specifically, when the interrupt processing is accepted at the clock C16, the internal status of the processor 2 (values of the PC and the PSW: int12 (PC), int12 (PSW)) is stored in the EIPC register 243 and the EIPSW register 244.

At a clock C17, in the interrupt controller 1, the flag register 121 of the interrupt factor INT32 is cleared in response to the interrupt acceptance notice INTACK. Further, the lowest bit of the ISPR register 13 is set to "1" ("0011b") in response to the priority level of "Pri0" of the interrupt factor INT32. Furthermore, in the processor 2 that outputs the interrupt acceptance notice INTACK, "1" is set to the interrupt inhibition flag DI in the PSW, setting to the interrupt inhibition state.

At the clock C17, under control by the interrupt processing control circuit 21 that accepts the interrupt request, the instruction fetch control circuit 22 fetches the instruction code of the interrupt handler, i.e. the EI instruction and the register data saving control circuit 25 starts the register data saving processing. At this time, the interrupt pattern number INTPTN of "2H" PTN2 is set to the pattern number register 250.

Here, the register data saving control circuit 25 extracts the register pattern from the register list unit 27 based on to the interrupt pattern number INTPTN of "2H" (PTN2). Then, the register data saving control circuit 25 supplies a multi-cycle microinstruction containing the register pattern "PTN2" to the instruction executing section 23. The instruction executing section 23 makes the fetched EI instruction to be waited and first, executes the multi-cycle microinstruction supplied from the register data saving control circuit 25. Thus, in clocks C17 to C23, the data of the EIPC register 243, the EIPSW register 244 and the general purpose registers R10, R11, R12, R13, R14 of the register pattern based on the interrupt pattern number INTPTN "2H" (PTN2) is saved into the data memory 4, and at a clock C24, the register pattern number PTN "2H" (PTN2) in the pattern number register 250 is saved into the data memory 4.

When ending saving of the data of registers of the designated register pattern, the instruction executing section 23 executes the fetched EI instruction (interrupt permission instruction) at a clock C25. Subsequently, the instruction is fetched from an address of the interrupt handler designated based on the interrupt vector "300H" and the interrupt handler is executed by the instruction executing section 23. Through execution of the EI instruction at the clock C25, the interrupt inhibition state is released at a next clock C26.

As described above, according to the present invention, since the registers can be uniquely designated as the data-saved registers based on the interrupt factor, only data of a minimum number of registers that may be destructed can be saved each time the interrupt processing is executed.

Figure 9B:
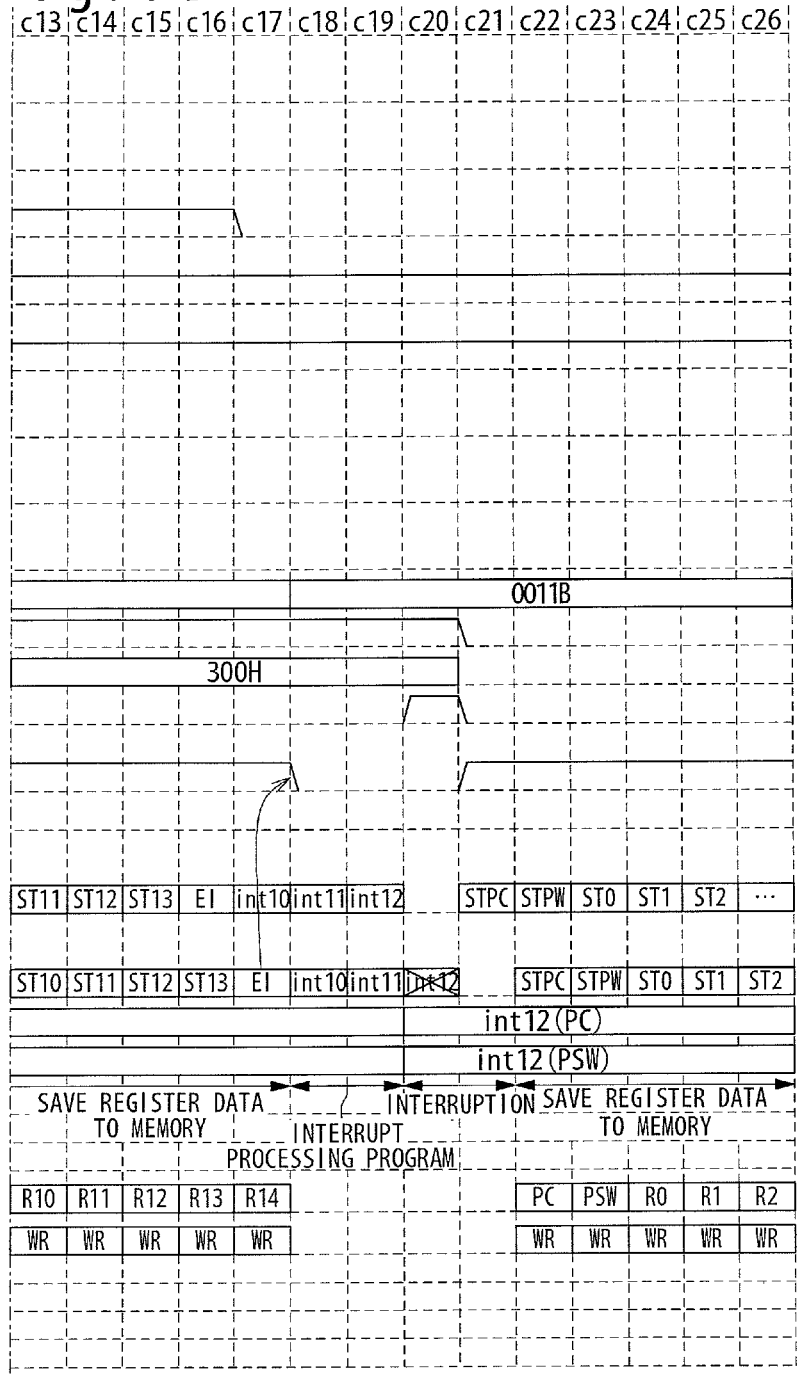

Next, referring to a conventional example shown in FIGS. 9A and 9A, effects of the interrupt acceptance processing according to the present invention will be described. FIGS. 9A and 9B show timing charts in the interrupt processing according to the conventional example.

According to the conventional example, when the interrupt request is accepted by the processor 200 at the clock C4, the processing of the fetched instruction is interrupted at the clock C4 and data of the PC and the PSW are stored in the EIPC register and the EIPSW register at the clock C5. Then, from the clock C6 and the subsequent, the instruction for saving the data of the EIPC, the EIPSW and the general purpose registers is fetched and executed.

In the conventional example, since an instruction for the register data saving processing is fetched and executed, a period from interruption of the current processing to start (execution) of the register data saving processing is two clocks. Meanwhile, according to the present invention, the register data saving processing is controlled based on the microinstruction supplied from the register data saving control circuit 25 that operates in response to the interrupt request supplied from the interrupt processing control circuit 21. That is, since the register data saving processing can be performed without fetching the interrupt handler after the interruption of the current processing, a period from the processing interruption to start of the register data saving processing is one clock, which means that the register data saving processing can be started faster than conventional example.

According to the present invention, since the instruction (in this example, EI instruction) to be executed after the register data saving processing is already fetched during execution of the register data saving processing, execution of the interrupt handler can be started immediately after the register data saving processing.

According to the conventional example, the data-saved registers cannot be selected for each interrupt factor. For this reason, in a system in which multiple interrupts are permitted, it is necessary to always designate all the registers that may be used in all types of interrupt processing, irrespective the interrupt processing, so that the of the register data are not destroyed even if any type of interrupt processing is executed. In the example shown in FIGS. 9A and 9B, the general purpose registers R0 to R4 and R10 to R14 are set as the data-saved registers. In this case, even if it is the data of only the general purpose registers R0 to R4 that may be destroyed through the interrupt processing of the interrupt factor INT31, the data of general purpose registers R10 to R14 are also saved, resulting in that time necessary for the register data saving processing becomes 11 clocks of the clocks C6 to C16.

On the contrary, according to the present invention, when the interrupt processing of the interrupt factor INT31 is performed, only the data of registers R0 to R4 can be selected and saved since the data-saved registers can be selected for each interrupt factor. In this case, time necessary for the register data saving processing including time necessary for saving of the register pattern number PTN becomes eight clocks of the clocks C5 to C12, which is much smaller than in the conventional example.

In the conventional example, the memory capacity for saving the data of general purpose registers R10 to R14 is excessively used. However, in the present invention, since unnecessary register data saving processing is not performed, the memory capacity necessary for the register data saving processing can be reduced. Thus, a capacity of the data memory 4 can be reduced, resulting in miniaturization of the circuit.

Next, referring to FIGS. 10, 11A and 11B, details of operation in interrupt return processing according to the present invention will be described.

Figure 10:
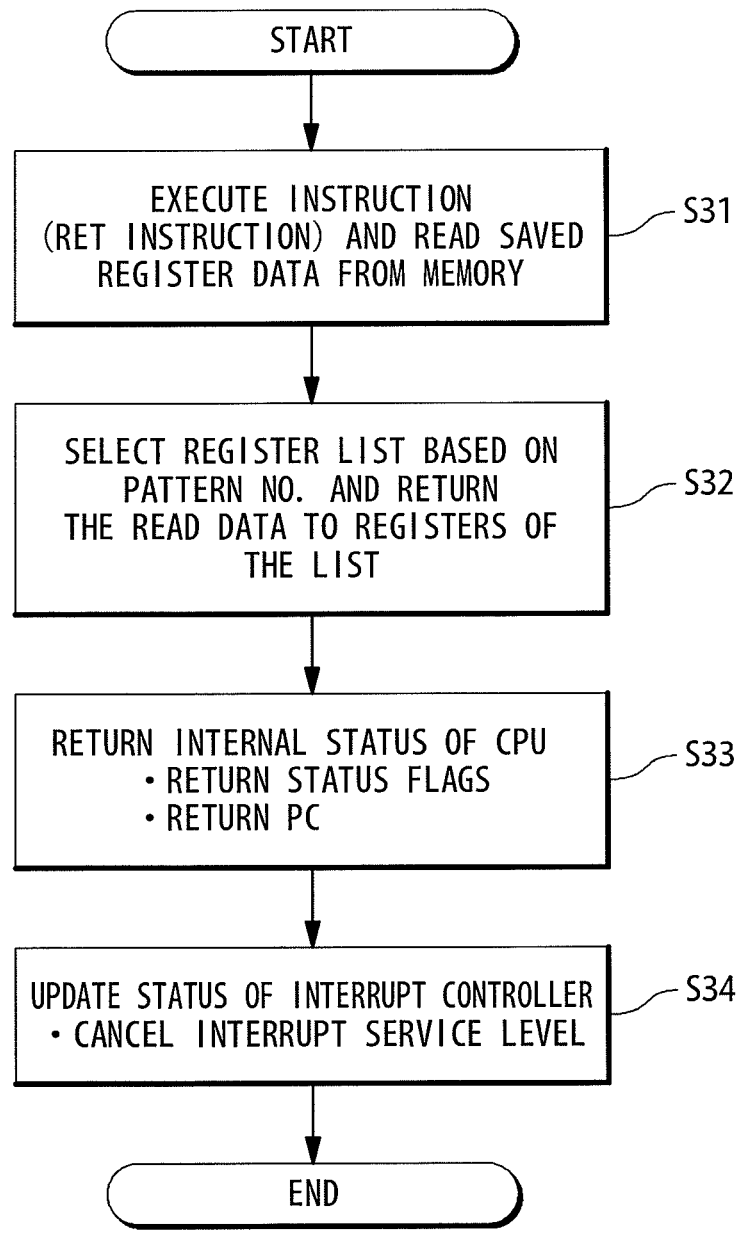
FIG. 10 is a flowchart showing an operation of return processing according to the first embodiment of the present invention.

FIG. 10 is a flowchart showing the details of operation in the return processing at Steps S203 and S302 shown in FIG. 6.

Referring to FIG. 10, the processor 2 reads the register pattern number PTN from a location of the data (stack) memory 4 designated by a stack point (SP) in response to execution of the RET instruction in the interrupt processing (Step S31). Subsequently, the register data are selected based on the read register pattern number PTN, and the register data, that have been stored in the data (stack) memory 4 in response to the microinstruction (operation of push instructions), are read out from the data memory 4 in response to a microinstruction (operation of pop instructions) supplied from the register data saving control circuit 25 and written to the registers in the register file (Step S32). Here, the register data saving control circuit 25 specifies the register pattern (here, return register pattern of registers) based on the read register pattern number PTN and returns the register data to the registers of the register file 24 in response to the microinstruction. Thus, the register data saved into the data memory 4 in the interrupt processing are returned.

When the data of EIPC and EIPSW registers 243 and 244 are returned at Step S32, the internal status (PC, PSW) of the processor 2 is returned at timing next to the return of the data of EIPC and EIPSW registers 243 244 (Step S33). Here, the data of the EIPC register 243 and the data of the EIPSW register 244 are stored in the PC register 241 and the PSW register 242, respectively.

Subsequently, the service level of the ISPR (interrupt service priority level) register 13 in the interrupt controller 1 is changed in response to the interrupt end notice INTFIN from the processor 2 (Step S34). More specifically, when executing the RET instruction, the processor 2 sets the interrupt end notice INTFIN to "1" during one clock and the interrupt controller 1 changes the ISPR register 13 in response to the interrupt end notice.

As described above, according to the present invention, since the registers to which data are to be returned are uniquely designated based on the read register pattern number PTN, only the saved register data can be returned. Further, since the interrupt return processing is achieved by executing the micro program supplied from the register data saving control circuit 25, it is unnecessary to fetch any instruction from the instruction memory 3. For this reason, the memory capacity for storing a set of instructions necessary for the interrupt return processing can be reduced. Further, time necessary to fetch the return instruction can be reduced and thus, time necessary for interrupt return processing can be reduced.

Figure 11A:
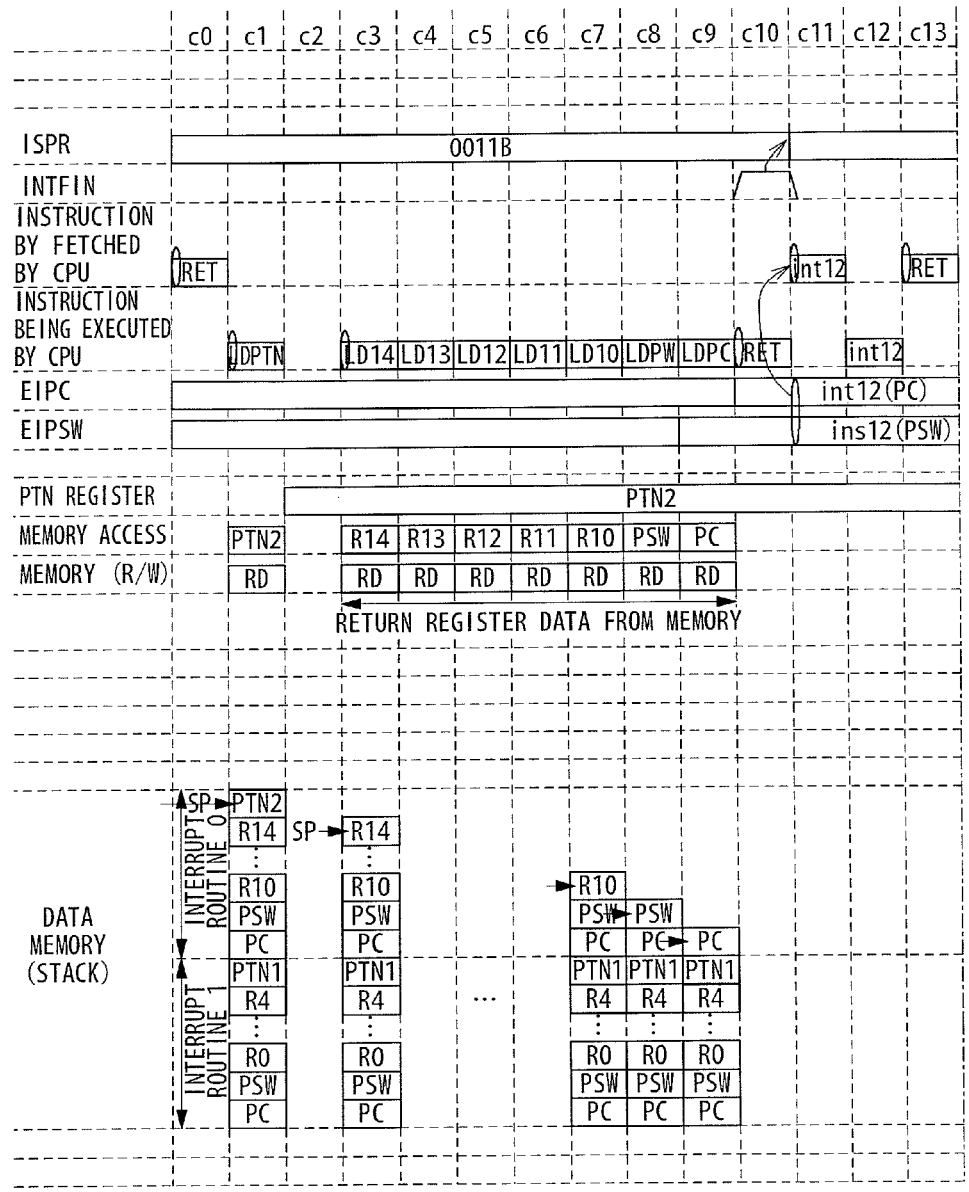

FIGS. 11A and 11B show timing charts in the interrupt return processing according to the present embodiment of the present invention. Referring to FIGS. 11A and 11B, details of operation in the interrupt return processing according to the present embodiment will be described. Here, as an example, the interrupt return processing from the interrupt processing shown in FIGS. 8A and 8B will be described.

First, at the clock C0, the interrupt processing of the interrupt factor INT32 is ended and the RET instruction is fetched. At a clock C1, the processor 2 executes the microinstruction supplied from the register data saving control circuit 25 and reads the register pattern number PTN from the data memory 4. More specifically, in response to fetching of the RET instruction, the interrupt processing control circuit 21 issues an instruction to the register data saving control circuit 25. At the clock C1, in response to the instruction from the interrupt processing control circuit 21, the register data saving control circuit 25 outputs a microinstruction for performing register data return processing to the instruction executing section 23. The instruction executing section 23 executes the microinstruction in multi-cycles, reads the register pattern number PTN "2H" (PTN2) from a location represented by the stack pointer SP and stores the register pattern number in the pattern number register 250 at a clock C2. The stack pointer SP is updated sequentially from the highest location when the microinstruction is executed, i.e., in response to a pop instruction.

In clocks C3 to C9, the processor 2 designate the registers to which data are to be returned, based on the register pattern number PTN "2H (PTN2)" in the pattern number register 250 and executes the interrupt return processing in response to the microinstruction.

More specifically, the register data saving control circuit 25 extracts the register pattern from the register list unit 27 based on the register pattern number PTN "2H" (PTN2). Then, the register data saving control circuit 25 supplies (a register data return instruction of) the multi-cycle microinstruction containing the register pattern "PTN2" to the instruction executing section 23. The instruction executing section 23 executes the register data return instruction supplied from the register data saving control circuit 25. Thus, in the clock C3 to C9, the data of "R14 to R10", PSW "int12 (PSW)" and PC "int12 (PC)" are read from the locations designated by the stack pointer SP in response to pop instructions and returned to the general purpose registers R14, R13, R12, R11, and R10, the EIPSW register 244 and the EIPC register 243 that are designated by the register pattern number INTPTN "2H" (PTN2), respectively, at subsequent clocks.

When the RET instruction is executed by the instruction executing section 23 at a clock C10, the processor 2 (interrupt processing control circuit 21) sets the return end notice INTFIN to "1" during one clock. At this time, the internal status (PC, PSW) of the processor 2 is returned to data of the EIPC register 243 and the EIPSW register 244 (int12 (PC), int12 (PSW)).

From a clock C11 and the subsequent, the processing that has not been completed due to the interrupt processing is restarted based on the returned PC and PSW. Here, the instruction "Int12" is fetched at the clock 11 and executed at a clock C12.

When the processing interrupted due to the interrupt request is ended, the RET instruction is fetched at a clock C13. At a clock C14, the processor 2 executes the microinstruction supplied from the register data saving control circuit 25 and reads the register pattern number PTN from the data memory 4.

Subsequently, as in the clocks C1 to C9, at clocks C14 to C22, the register pattern number PTN "1H" (PTN1), and data "R4 to R0", PSW "int4 (PSW)" and PC "int4 (PC)" that have been saved into the data memory 4 are read in this order and returned to the pattern number register 250, and the general purpose registers R4, R3, R2, R1, and R0, the EIPSW register 244 and the EIPC register 243 that are designated by the register pattern number INTPTN "1H" (PTN1, respectively.

From a clock C24 and the subsequent, in response to completion of the return processing to the registers, the main routine after into suspended due to the interrupt is executed.

As described above, in the interrupt return processing in the present embodiment, the saved register pattern number PTN is returned and the registers to which data are to be returned can be designated by using the register pattern number PTN. For this reason, the interrupt return processing can be performed in response to the microinstruction, thereby reducing time necessary to fetch a return instruction.

[Second Embodiment]

Next, referring to FIGS. 12A, 12B, 13, and 14, details of operation in interrupt processing of the microcomputer according to a second embodiment of the present invention will be described. In the first embodiment, since the register data saving processing can be performed without fetching the instruction code of the interrupt handler, the register data saving processing can be started earlier than conventional by one clock. In the second embodiment, the effect that the register data saving processing can be started earlier than conventional is achieved more remarkably than in the first embodiment.

Figure 12A:
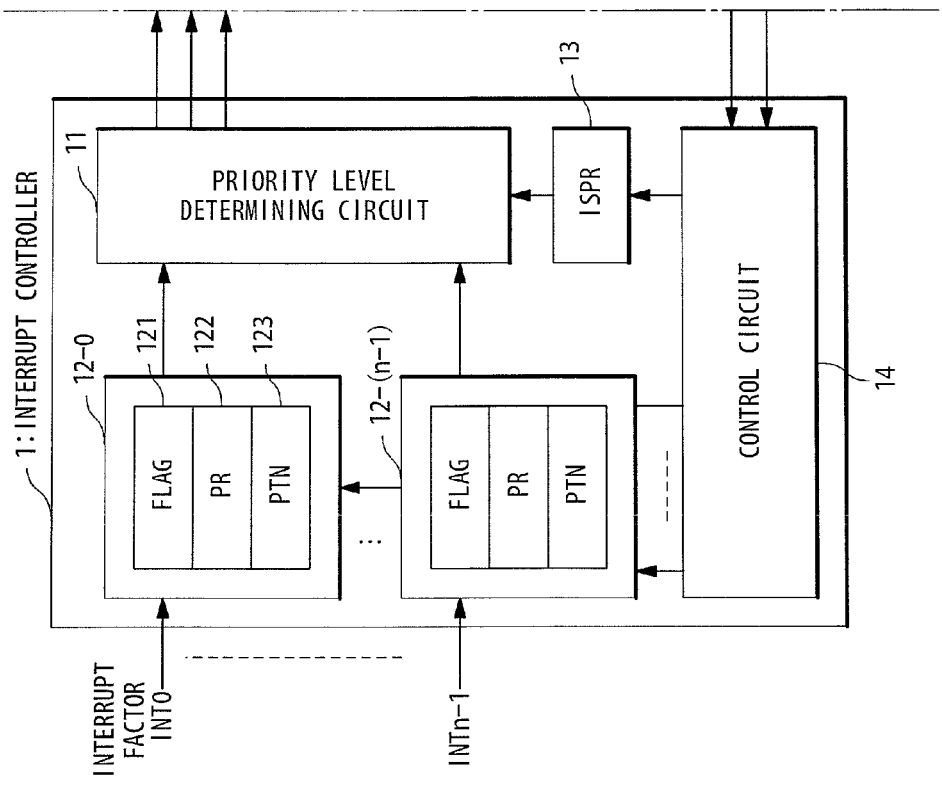

FIGS. 12A and 12B are diagrams showing a configuration of the circuit block relating to the interrupt processing of the microcomputer according to the second embodiment of the present invention. Referring to FIGS. 12A and 12B, the instruction executing section 23 in the second embodiment has a multi-stage pipeline configuration. The configuration other than the instruction executing section 23 are the same as that in the first embodiment and thus, detailed description thereof is omitted.

The instruction executing section 23 in the second embodiment is provided with a dispatch stage DP 231, an instruction decode stage 1D 232, an operation stage EX 233, an address transfer stage DT 234, a data fetch stage DF 235 and a write back stage WB 236. The dispatch stage DP 231 determines an execution unit based on instruction code fetched by the instruction fetch control circuit 22. The instruction decode stage 1D 232 decodes the instruction code, generates immediate data and reads data from an instruction register designated in the dispatch stage DP 231 or the microinstruction. The operation stage EX 233 performs an operation of the instruction read from the instruction register to generate an address for memory access. The address transfer stage DT 234 transfers the address generated by the operation stage EX 233 to the data memory 4 and performs memory access. The data fetch stage DF 235 acquires data from the data memory 4 based on the address generated by the operation stage EX 233 and transfers the to the write back stage WB 233. The write back stage WB 236 writes the acquired data to the general purpose register 240.

In the microcomputer in the second embodiment, the interrupt processing and the interrupt return processing are accelerated by pipeline processing. According to the present invention, by executing the microinstruction supplied from the register data saving control circuit 25, processing for two clocks, i.e., the clocks necessary for fetching and decoding of the instruction code can be omitted. As a result, the register data saving processing and the interrupt return processing can be started earlier than conventional by at least two clocks.

Figure 13:
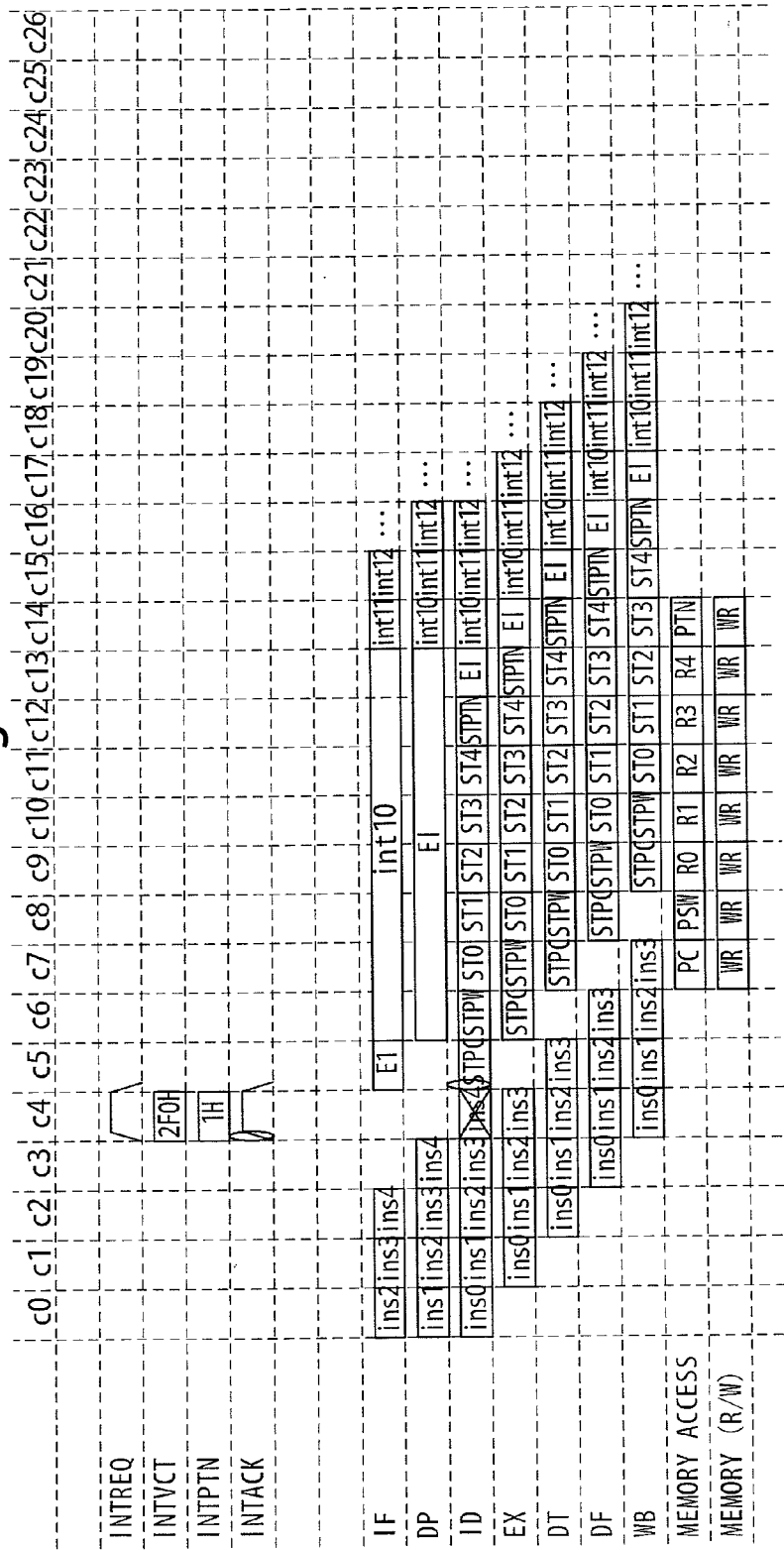
FIG. 13 shows timing charts in an operation of interrupt processing according to the second embodiment of the present invention.

FIG. 13 shows timing charts in the interrupt processing according to the second embodiment of the present invention. Referring to FIG. 13, details of operation of the interrupt processing according to the second embodiment will be described. Here, the operation when the interrupt request is generated at the clock C4 during the execution of the main routine will be described.

As in the first embodiment, the interrupt controller 1 notifies generation of the interrupt factor INT31 to the processor 2 at the clock C4 after generation of the interrupt factor INT31 by two clocks. Here, "1" is set to the interrupt request INTREQ, and "2F0H" as the interrupt vector INTVCT and "1H" as the interrupt pattern number INTPTN are outputted.

When the processor 2 enters the interrupt acceptance state at the clock C4, the processor 2 accepts the interrupt vector INTVCT "2F0H" (interrupt factor INT31) outputted from the interrupt controller 1 and returns the interrupt acceptance notice INTACK to the interrupt controller 1.

When the interrupt request is accepted at the clock C4, the internal status (data of the PC and the PSW: ins4 (PC), ins4 (PSW)) of the processor 2 are stored in the EIPC register 243 and the EIPSW register 244.

At the clock C5, under control of the interrupt processing control circuit 21 that accepts the interrupt request, the instruction fetch control circuit 22 fetches an instruction (EI instruction) of the interrupt handler and the register data saving control circuit 25 starts the register data saving processing. At this time, the register pattern number PTN "1H" (PTN1) is set to the pattern number register 250.

More specifically, the register data saving control circuit 25 extracts a register pattern based on the register pattern number INTPTN "1H" (PTN1) from the register list unit 27. The register data saving control circuit 25 supplies a multi-cycle microinstruction containing the register pattern "PTN1" to the instruction executing section 23. At the clock C6, the instruction executing section 23 delays execution of the EI instruction fetched in the dispatch stage DP 231 in the next stage.

While the EI instruction is delayed in the dispatch stage DP 231, the microinstruction from the register data saving control circuit 25 is executed in the instruction decode stage 1D 232 and subsequent stages. Here, by the pipeline processing from the instruction decode stage 1D 232 to the write back stage WB 236 based on the microinstruction, the register data saving processing is performed. In this example, the EIPC register 243, the EIPSW register 244 and the general purpose registers 240 (R0 to R4) are designated as the data-saved registers based on the register pattern "PTN1". For this reason, by the processing in each of the instruction decode stage 1D 232 in the clocks C5 to C11, the operation stage EX 233 in the clocks C6 to C12 and the address transfer stage DT 234 in the clocks C7 to C13, the data set to the EIPC register 243, the EIPSW register 244 and the general purpose registers 240 (R0 to R4) that are designated based on the register pattern "PTN1" are saved on the data memory 4. Further, by the processing in each of the instruction decode stage ID 232 at the clock C12, the operation stage EX 233 at the clock C13 and the address transfer stage DT 234 at the clock C14, the register pattern number PTN "1H"(PTN1) in the pattern number register 250 is saved into the data memory 4.

When executing an STPTN instruction for saving the register pattern number PTN by the instruction decode stage ID 232, the instruction executing section 23 executes the EI instruction held and delayed in the dispatch stage DP 231 by the pipeline processing from the next clock C13 and the subsequent. Then, the instruction handler designated by the interrupt vector "2F0H" is executed by the instruction executing section 23.

As described above, according to the present invention, since the data-saved registers can be designated simultaneously with the interrupt acceptance and the register data saving processing can be performed in response to the microinstruction, processing in an instruction fetch IF stage and the dispatch stage DP can be omitted from the pipeline processing. For this reason, the register data saving processing can be performed earlier than conventional by two clocks.

Figure 14:
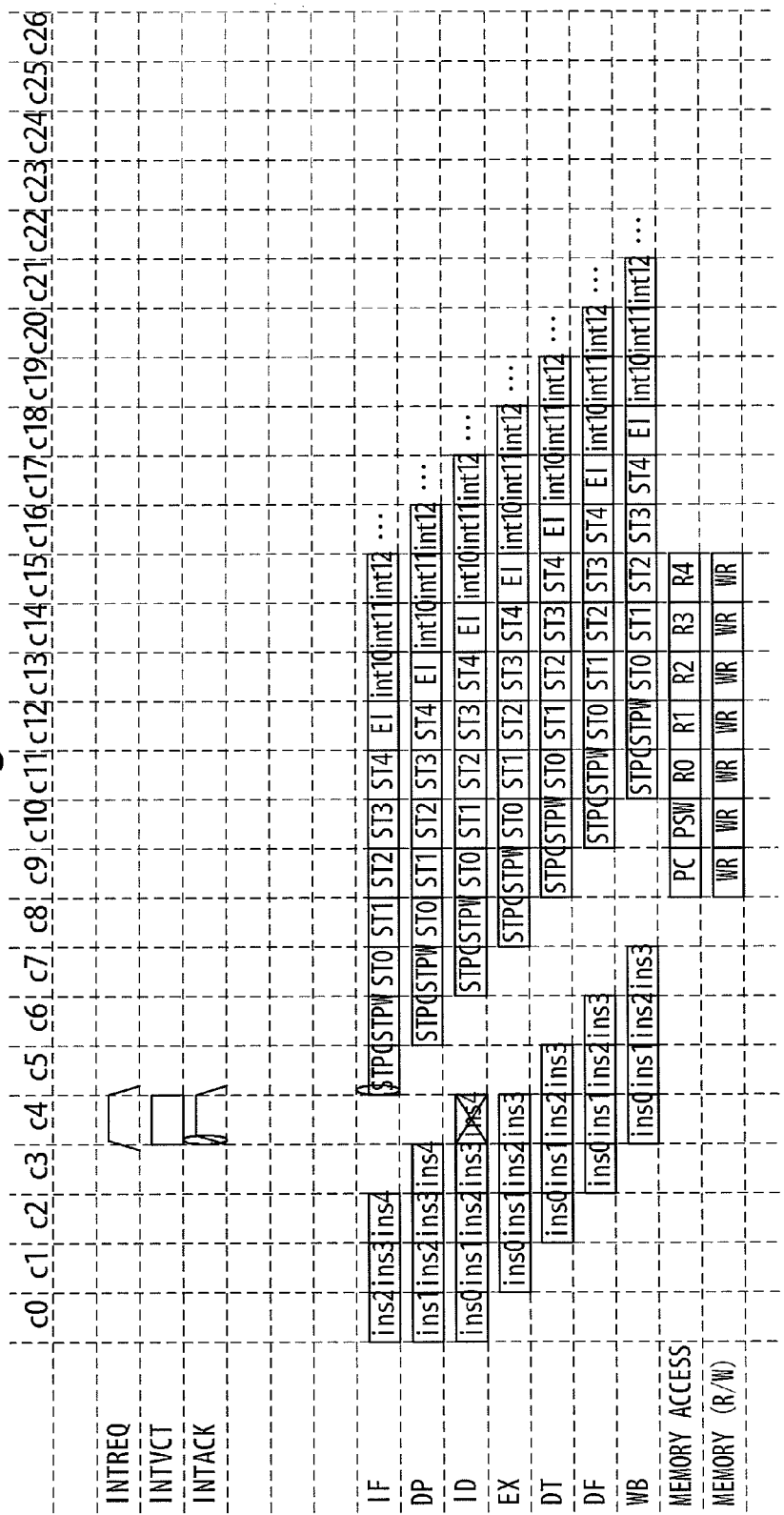
FIG. 14 shows timing charts in an interrupt operation by pipeline processing according to the conventional example.

FIG. 14 shows timing charts in the conventional interrupt processing by the pipeline processing when the data-saved registers are the EIPC register 243, the EIPSW register 244 and the general purpose registers 240 (R0 to R4).

As shown in FIG. 14, when the data-saved registers are same as registers shown in FIG. 13, since the register data saving processing is performed through the instruction fetch stage IF and the dispatch stage DP in the conventional example, the register data saving processing is delayed by two clocks as compared to the present invention.

Also, according to the interrupt processing in the second embodiment, since the registers can be uniquely designated as the data-saved registers based on the interrupt factor, only a minimum number of registers can be saved for preventing data destruction each time the interrupt processing is executed. For this reason, as in the first embodiment, the amount of data saved in the interrupt processing can be reduced and time necessary for the register data saving processing can be also reduced.

Further, as in the interrupt return processing, the interrupt return processing can be accelerated through the pipeline processing by two clocks.

[Third Embodiment]

Figure 15A:
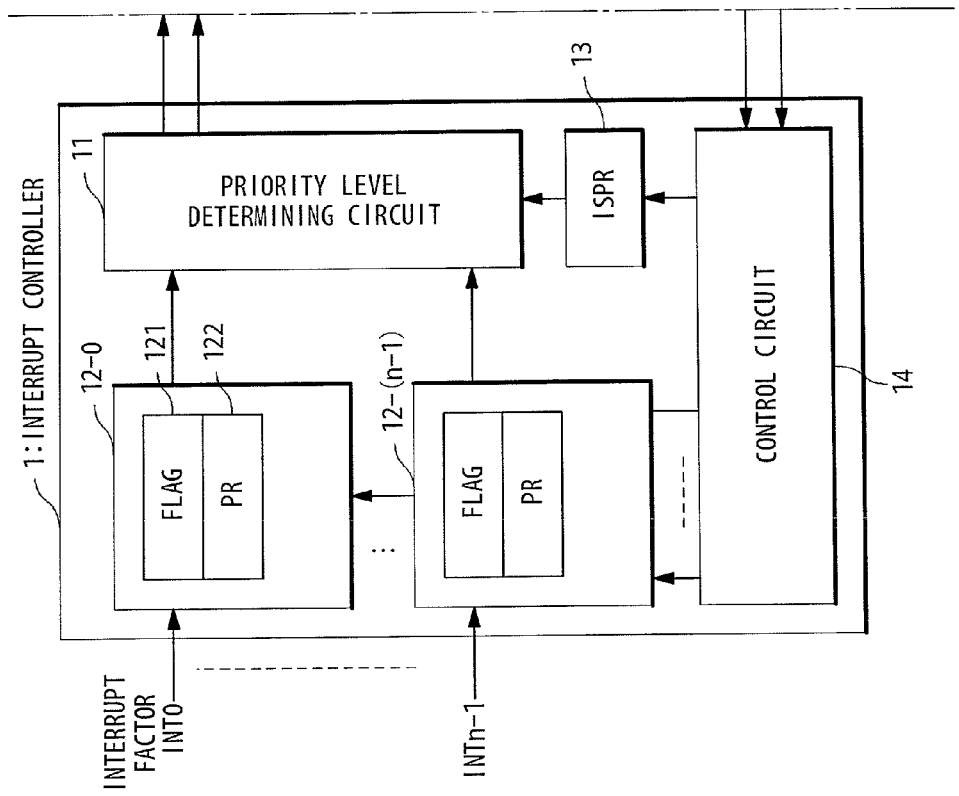

Next, referring to FIGS. 15A, 15B, 16A and 16B, the microcomputer according to a third embodiment of the present invention will be described. FIGS. 15A and 15B are diagrams showing a configuration of the circuit block relating to the interrupt processing of the microcomputer according to the third embodiment of the present invention. Referring to FIGS. 15A and 15B, in the microcomputer of the third embodiment, the pattern number register 123 of each of the interrupt factor register groups 12-0 to 12-(n−1) in the first embodiment is omitted and the pattern number generating circuit 5 is provided. The configuration other than the pattern number generating circuit 5 is the same as that in the first embodiment and thus, description thereof is omitted.

In the first embodiment, the register pattern number PTN for each interrupt factor is stored in the pattern number register 123 provided in association with each of the interrupt factors INT0 to INTn−1 and the register pattern number is notified to the processor 2 as INTPTN. In the third embodiment, the pattern number generating circuit 5 is provided to output the pattern number PTN based on the interrupt vector INTVCT. Based on a pattern number table in which the previously prepared sets of one interrupt vector INTVCT and one register pattern number PTN are stored, the pattern number generating circuit 5 designates the register pattern number PTN corresponding to the interrupt vector INTVCT and outputs the designated pattern number PTN to the processor 2 as the interrupt pattern number INTPTN. As a result, it is unnecessary to provide the pattern number register 123 for each interrupt factor INT, resulting in reduction of the circuit scale.

Figure 16B:
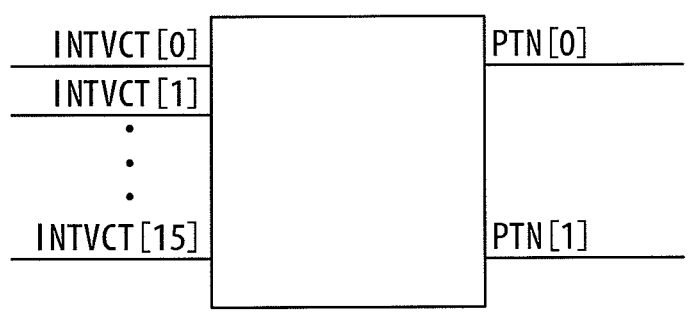
FIG. 16B is a diagram showing the pattern number generating circuit in the third embodiment.

Referring to FIGS. 16A and 16B, a configuration of the pattern number generating circuit 5 will be described. FIG. 16A is a diagram showing the pattern number table used by the pattern number generating circuit 5, and FIG. 16B is a diagram showing the configuration of the pattern number generating circuit 5.

Referring to FIG. 16A, the register pattern number PTN "0" is associated with the interrupt vectors INTVCT "0100H" to "01F0H" corresponding to INT0 to INT15, the register pattern number PTN "1" is associated with the interrupt vectors INTVCT "0200H" to "02F0H" corresponding to INT16 to INT31, the register pattern number PTN "2" is associated with the interrupt vectors INTVCT "0300H" to "03F0H" corresponding to INT32 to INT47, and the register pattern number PTN "3" is associated with the interrupt vectors INTVCT "0400H" to "04F0H" corresponding to INT48 to INT61.

In this case, the pattern number generating circuit 5 includes a circuit for outputting the 2-bit register pattern number PTN, "00B", "01B", "10B", or "11B", based on the 16-bit interrupt vector INTVCT "0000H" to "1111H". For example, as shown in FIG. 16B, the pattern number generating circuit 5 receives a 16-bit interrupt vector INTVCT [15:0] and outputs a 2-bit interrupt pattern number INTPTN [10]. At this time, the pattern number generating circuit 5 determines any of the register pattern numbers PTN "00B" to "11B" by referring to the pattern number table shown in FIG. 16A. In this example, the pattern number generating circuit 5 can be realized as a circuit using the pattern number table shown in FIG. 16A, as the circuit outputs INTPTN of 00 (PTN of "0") at INTVCT [10:8]=000, INTPTN of 01 (PTN of "1") at INTVCT [10:8]=001, INTPTN of 10 (PTN of "2") at INTVCT [10:8]=011 and INTPTN of 11 (PTN of "3") at INTVCT [10:8]=100.

As described above, since the pattern number generating circuit 5 can generate the register pattern number PTN according to the interrupt vector INTVCT, it is unnecessary to provide the register for each interrupt factor INT. Especially, as shown in FIG. 16A, when the register pattern is common to a plurality of interrupt factors and four register patterns are assigned to 64 interrupt factors, 64 pattern number registers 123 need to be provided in the first embodiment, while the register pattern number PTN can be obtained without providing these registers in the present embodiment. That is, in the present embodiment, when the registers for data to be saved are common to the plurality of interrupt factors INT, the number of pattern number registers 123 can be reduced by provision of the pattern number generating circuit 5.

[Fourth Embodiment]

Next, the microcomputer according to a fourth embodiment of the present invention will be described. In the first embodiment, the registers to which data are to be returned in the interrupt return processing are designated based on the register pattern number PTN saved in the register data saving processing. In the microcomputer of the fourth embodiment, the register data to be returned are designated in response to a context return instruction (CXPOP instruction) as an example of a pop instruction without performing the register data saving processing and the interrupt return processing of the register pattern number PTN. The configuration of the microcomputer in the present embodiment is similar to that in the first embodiment. However, the microcomputer in the present embodiment is different from the first embodiment in that the register pattern number PTN is not saved in the register data saving processing and the register data saving control circuit 25 acquires the register pattern number PTN for specifying the registers to be returned in response to the CXPOP instruction. The other configuration and operations are same as those in the first embodiment and thus, description thereof is omitted.

Figure 17A:
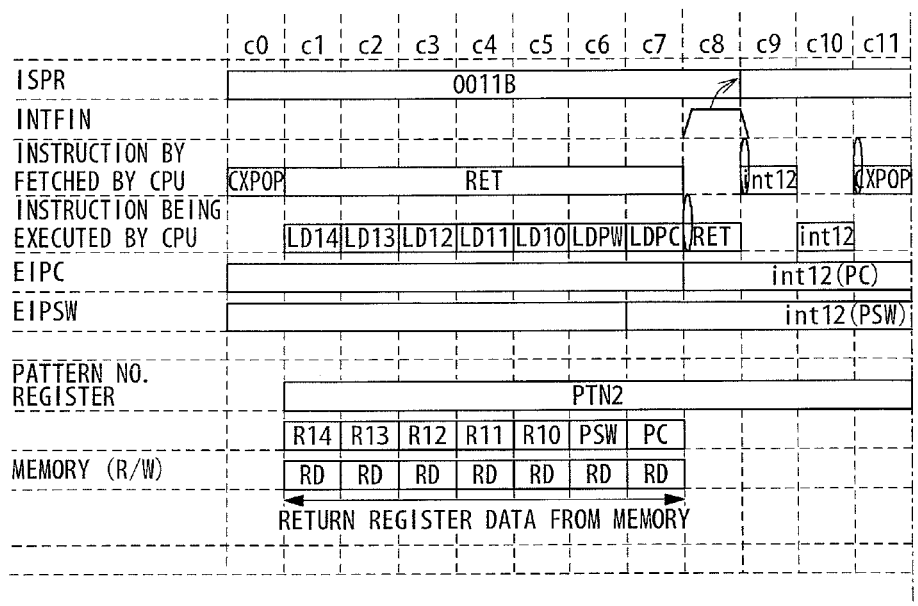
FIGS. 17A and 17B show timing charts in an operation in return processing according to a fourth embodiment of the present invention.
Figure 17B:
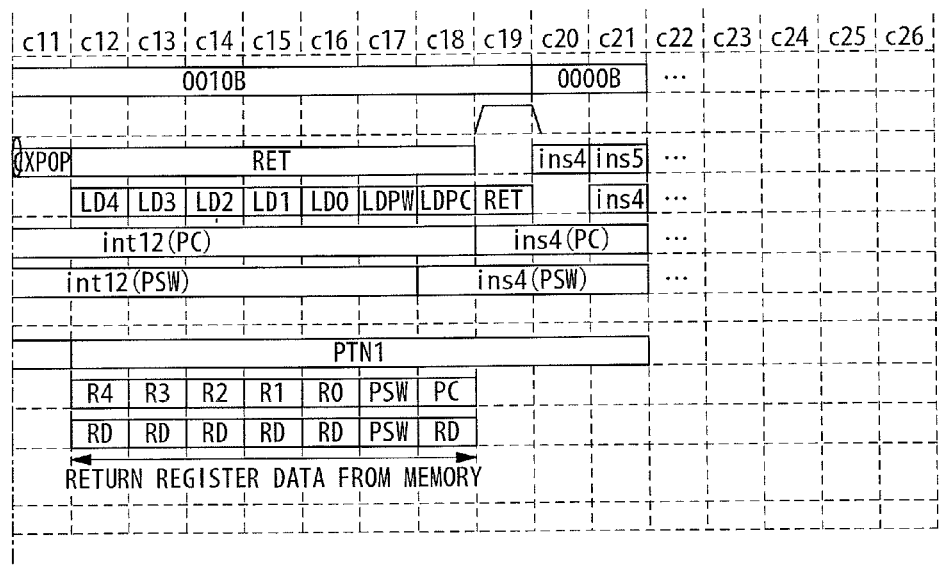

FIGS. 17A and 17B are flowcharts showing an operation in the interrupt return processing by the microcomputer according to the fourth embodiment of the present invention. Referring to FIGS. 17A and 17B, details of operation of the interrupt return processing according to the fourth embodiment will be described.

First, at a clock C0, the interrupt processing of the interrupt factor INT32 is ended and the CXPOP instruction is fetched. In response to the CXPOP instruction, the register pattern number PTN used for the interrupt return processing is designated. At a clock C1, the register data saving control circuit 25 designates the register data to be returned in response to the CXPOP instruction and controls the instruction executing section 23 to execute the interrupt return processing based on the microinstruction. Thus, at the clocks C1 to C7, context "R14 to R10", PSW "int12 (PSW)" and PC "int12 (PC)" are read from the stack memory based on the stack pointer SP and returned to the general purpose registers 240, the EIPSW register 244 and the EIPC register 243 that are designated by the register data saving control circuit 25.

Meanwhile, at the clock C1, the interrupt processing is ended and the RET instruction is fetched. Here, until a clock C8 at which the interrupt return processing under control by the register data saving control circuit 25 is ended, execution of the fetched RET instruction is made to be held and delayed.

At the clock C8, when the instruction executing section 23 executes the RET instruction, the processor 2 (interrupt processing control circuit 21) sets the return end notice INTFIN to "1" during one clock. At this time, the internal states (PC, PSW) of the processor 2 are returned to data of the EIPC register 243 and the EIPSW register 244 (int12 (PC), int12 (PSW)).

From a clock C9 and the subsequent, the processing that has not been completed due to the interrupt is restarted based on the returned PC and PSW. Here, the instruction "int12" is fetched at the clock C9 and executed at a clock C10.

When the processing interrupted due to the interrupt request is ended, the CXPOP instruction is fetched at a clock C11. At a clock C12, the processor 2 executes the microinstruction stored in the register data saving control circuit 25 and starts the register data saving processing based on the register pattern number PTN designated in response to the CXPOP instruction.

Next, as at clocks C1 to C7, in clocks C12 to C18, context "R4 to R0", PSW "int4 (PSW)" and PC "int4 (PC)" saved into the data memory 4 are read in this order and returned to pattern number register 250, and the general purpose registers R4, R3, R2, R1, and R0, the EIPSW register 244 and the EIPC register 243 that are designated by the register pattern number PTN "1H" (PTN1).

From a clock C20 and the subsequent, in response to completion of saving of each register data, the main routine after into interrupted due to the interrupt request is executed.

As described above, in the interrupt return processing in the present embodiment, since the registers for data to be returned can be designated based on the CXPOP instruction, the saving processing and the interrupt return processing of the register pattern number PTN can be omitted. This can reduce the memory region and time necessary for the saving processing and the interrupt return processing in the interrupt processing. That is, in the present embodiment, time necessary for the interrupt processing and the interrupt return processing can be further reduced.

In the microcomputer according to the present invention, since the data-saved or -returned registers can be designated based on the interrupt pattern number PTN set for each interrupt factor, the register data saving processing can be performed based on the multi-cycle microinstruction without fetching the instruction. For this reason, time necessary to fetch the instruction for saving can be reduced and the data-saved register can be designated based on the interrupt factor.

Moreover, since the saving processing can be achieved by executing the microinstruction, even if multiple interrupts occur, fetch time for the saving processing is not accumulated, unlike the conventional case. For this reason, according to the present invention, when multiple interrupts occur, time for the interrupt processing is further reduced than conventional, and therefore, processing capability of the processor can be improved.

Although embodiments of the present invention have been described in detail, the detailed configurations are not limited to the above-mentioned embodiments, and modifications without departing from the subject matter of the present invention fall within the scope of the present invention. The above-described embodiments may be combined so as not to cause technical contradiction. For example, by combining the second embodiment with the fourth embodiment, time necessary for the interrupt processing and the interrupt return processing can be further reduced. Alternatively, by combining the third embodiment with the second or the fourth embodiment, time necessary for the interrupt processing and the interrupt return processing can be reduced while reducing a circuit area.

What is claimed is:

1. A microcomputer including:
an instruction memory;
a data memory;
a processor coupled to both the instruction memory and the data memory, the processor including:
a register file including a program counter register, a program states word register and a plurality of general purpose registers;
a memory configured to store a plurality of register lists having a plurality of register patterns, respectively, each of the plurality of register patterns designating registers selected from the registers in the register file, data of which are to be saved in the data memory;
an instruction fetch control circuit configured to fetch an instruction code of an interrupt handler from the instruction memory according to a control signal;
a register data saving control circuit configured to acquire, from the memory, one register pattern from one of the plurality of register lists according to a first pattern number, and issue a microinstruction based on the acquired register pattern;
an interrupt processing control circuit configured to output, in response to an interrupt request issued based on occurrence of an interrupt factor, the control signal and the first pattern number; and
an instruction executing circuit configured to execute the microinstruction prior to the fetched instruction code, and save data of registers designated based on the acquired register pattern in the data memory; and an interrupt controller configured to output an interrupt vector and a second pattern number for an interrupt signal supplied on any of a plurality of interrupt signal lines, wherein the interrupt processing control circuit is configured to output the control signal according to the interrupt vector, and to output the first pattern number according to the second pattern number, wherein the interrupt controller includes a plurality of pattern number registers, one of which is provided for the interrupt factor, wherein the plurality of pattern number registers each store a pattern number, and wherein the interrupt controller is configured to output, as the second pattern number, a pattern number from a pattern number register that corresponds to the interrupt factor.

2. The microcomputer according to claim 1, wherein the register data saving control circuit is configured to save the first pattern number in the data memory in interrupt processing, and to store the data saved in the data memory to the registers designated based on the acquired register pattern in interrupt return processing.

3. The microcomputer according to claim 1, wherein the instruction executing circuit is configured to perform pipeline processing of the microinstruction issued from the register data saving control circuit.

4. The microcomputer according to claim 1, wherein each of the plurality of interrupt signal lines is associated with the interrupt factor, and some of the plurality of interrupt signal lines correspond to the acquired register pattern.

5. The microcomputer according to claim 1, wherein the register data saving control circuit is configured to specify registers as a return destination according to a pop instruction issued after other processing is completed, and to issue a return microinstruction to return the data saved in the data memory, and wherein the instruction executing circuit is configured to execute the return microinstruction to return the data saved in the data memory.

* * * * *